(12) United States Patent
Ryu et al.

(10) Patent No.: US 10,616,810 B2
(45) Date of Patent: Apr. 7, 2020

(54) METHOD FOR TRANSMITTING BUFFERED DATA IN WIRELESS COMMUNICATION SYSTEM, AND APPARATUS THEREFOR

(71) Applicant: LG Electronics Inc., Seoul (KR)

(72) Inventors: Jinsook Ryu, Seoul (KR); Jaehyun Kim, Seoul (KR); Taehun Kim, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/090,069

(22) PCT Filed: Mar. 30, 2017

(86) PCT No.: PCT/KR2017/003520
§ 371 (c)(1),
(2) Date: Sep. 28, 2018

(87) PCT Pub. No.: WO2017/171451
PCT Pub. Date: Oct. 5, 2017

(65) Prior Publication Data
US 2019/0116531 A1 Apr. 18, 2019

Related U.S. Application Data

(60) Provisional application No. 62/315,120, filed on Mar. 30, 2016.

(51) Int. Cl.
*H04W 28/04* (2009.01)
*H04W 36/02* (2009.01)
(Continued)

(52) U.S. Cl.
CPC ............. *H04W 36/02* (2013.01); *H04W 4/70* (2018.02); *H04W 8/08* (2013.01);
(Continued)

(58) Field of Classification Search
CPC ....... H04W 36/02; H04W 76/12; H04W 4/70; H04W 76/27; H04W 8/08; H04W 28/0205; H04W 36/0022; H04W 88/16
(Continued)

(56) References Cited

U.S. PATENT DOCUMENTS

| 2014/0242962 | A1* | 8/2014 | Choi | H04W 8/245 |
| | | | | 455/418 |
| 2015/0003312 | A1* | 1/2015 | Jeong | H04W 52/0216 |
| | | | | 370/311 |
| 2017/0048845 | A1* | 2/2017 | Chen | H04W 4/70 |

FOREIGN PATENT DOCUMENTS

| WO | WO2016024790 | 2/2016 |
| WO | WO2016032146 | 3/2016 |

OTHER PUBLICATIONS

NPL search history (Year: 2019).*
(Continued)

*Primary Examiner* — Sai Ming Chan
(74) *Attorney, Agent, or Firm* — Fish & Richardson P.C.

(57) ABSTRACT

A method for transmitting buffered data of an MME comprises the steps of: performing a CP mode; buffering downlink data, when the downlink data on a terminal is received from an S-GW, during an idle period in which an ECM-idle state of the terminal is maintained; receiving, from the terminal, a service request message for requesting a UP mode; transmitting, to a base station, an initial context setup request message for setting a DRB, and receiving, from the base station, an initial context setup completion message; and transmitting, to the S-GW, a modified bearer request message for setting an S1 bearer between the base station and the S-GW, wherein the buffered data is included in the initial context setup request message and may be transmitted to the base station.

15 Claims, 16 Drawing Sheets

(51) Int. Cl.
*H04W 28/02* (2009.01)
*H04W 76/12* (2018.01)
*H04W 4/70* (2018.01)
*H04W 76/11* (2018.01)
*H04W 76/27* (2018.01)
*H04W 8/08* (2009.01)
*H04W 36/00* (2009.01)
*H04W 88/16* (2009.01)
*H04W 12/06* (2009.01)
*H04W 80/02* (2009.01)

(52) U.S. Cl.
CPC ... *H04W 28/0205* (2013.01); *H04W 36/0022* (2013.01); *H04W 76/11* (2018.02); *H04W 76/12* (2018.02); *H04W 76/27* (2018.02); *H04W 88/16* (2013.01); *H04W 12/06* (2013.01); *H04W 80/02* (2013.01)

(58) Field of Classification Search
USPC .......................................................... 370/329
See application file for complete search history.

(56) References Cited

OTHER PUBLICATIONS

3rd Generation Partnership Project, "General Packet Radio Service (GPRS) enhancements for Evolved Universal Terrestrial Radio Access Network (E-UTRAN) access," dated Mar. 24, 2016, 3GPP TS 23.401 V13.6.1 367 pages.
Intel Corporation, "Bearer resumption issues for CIoT UP solution for LTE," 3GPP TSGRAN WG2 Meeting#93, dated Feb. 15-19, 2016, 5 pages.
Alcatel-Lucent et al., "Introduction of Control Plane CIoT EPS optimization" 3GPP TSG SA WG2 Meeting #113, dated Jan. 25-29, 2016, 14 pages.
International Search Report in International Application No. PCT/KR2017/003520, dated Jul. 24, 2017, 6 pages.

* cited by examiner

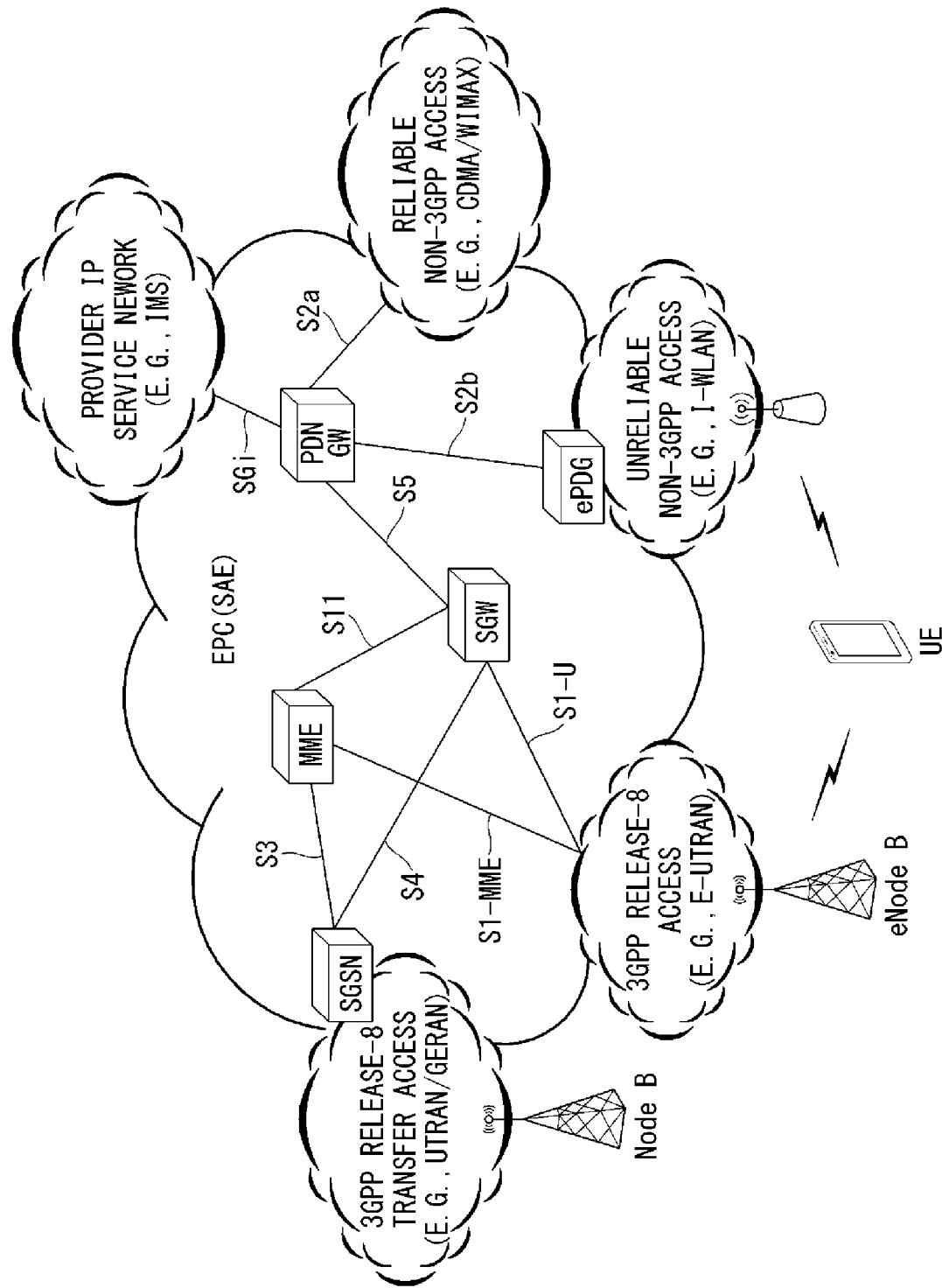
[FIG. 1]

[FIG. 2]
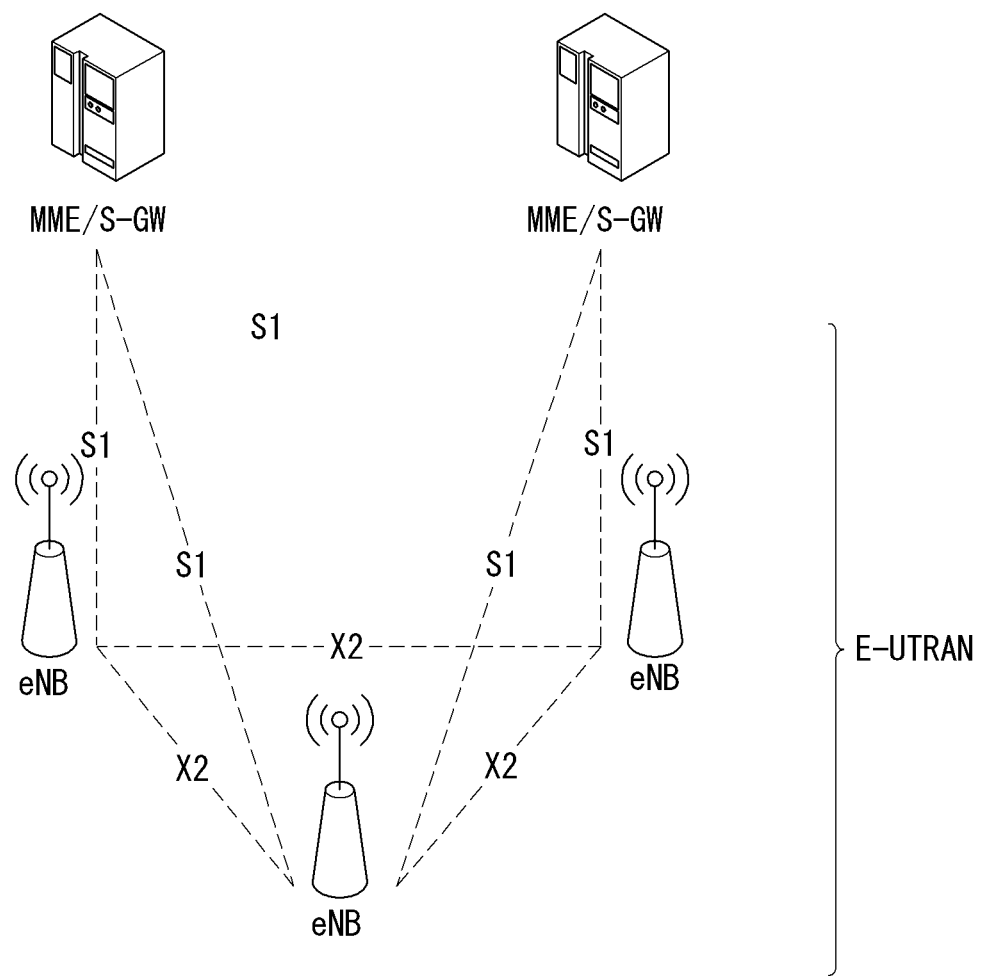

[FIG. 3]
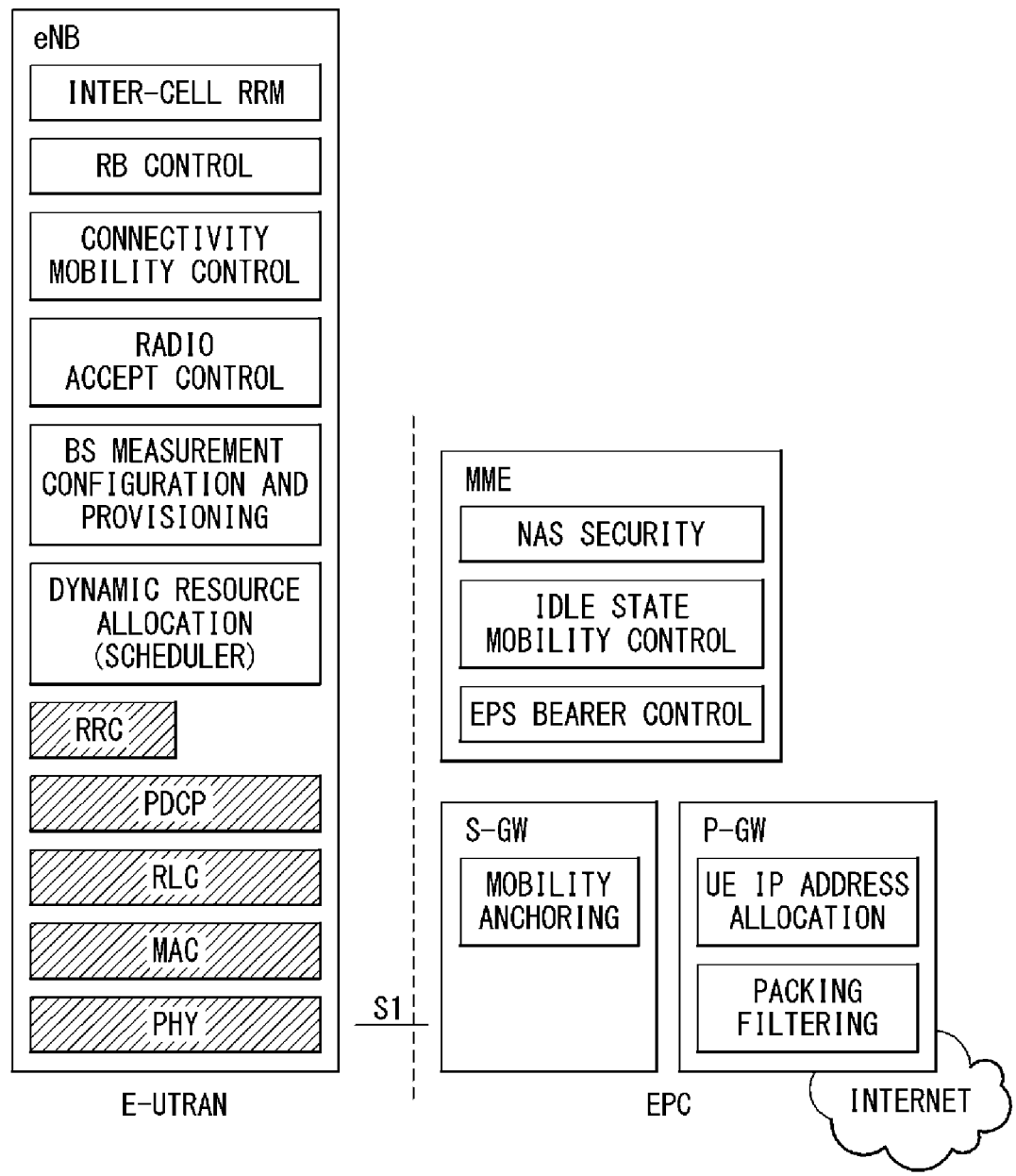

[FIG. 4]
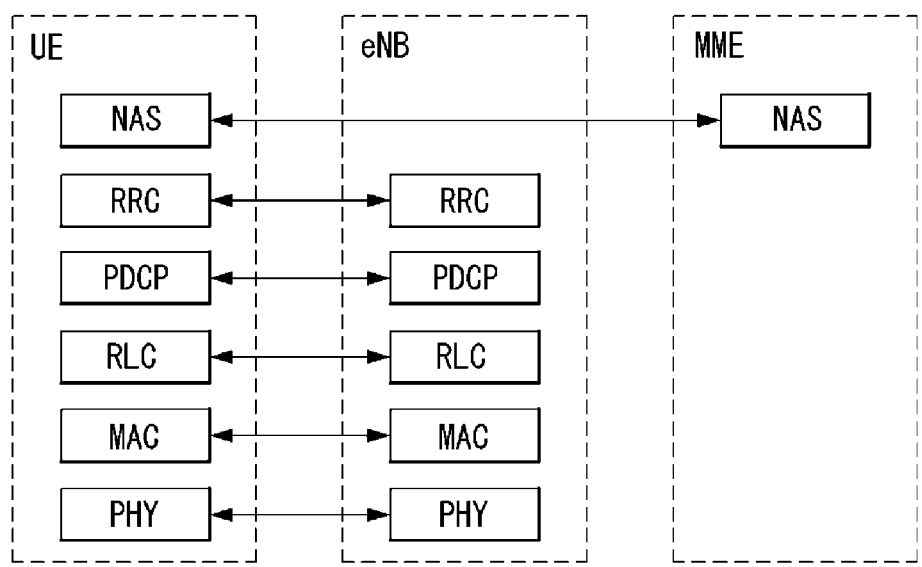
(a) CONTROL PLANE PROTOCOL STACK
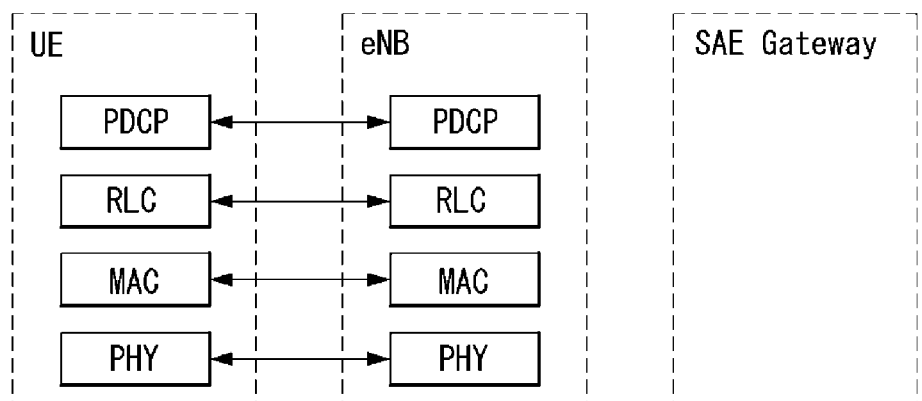
(b) USER PLANE PROTOCOL STACK

[FIG. 5]
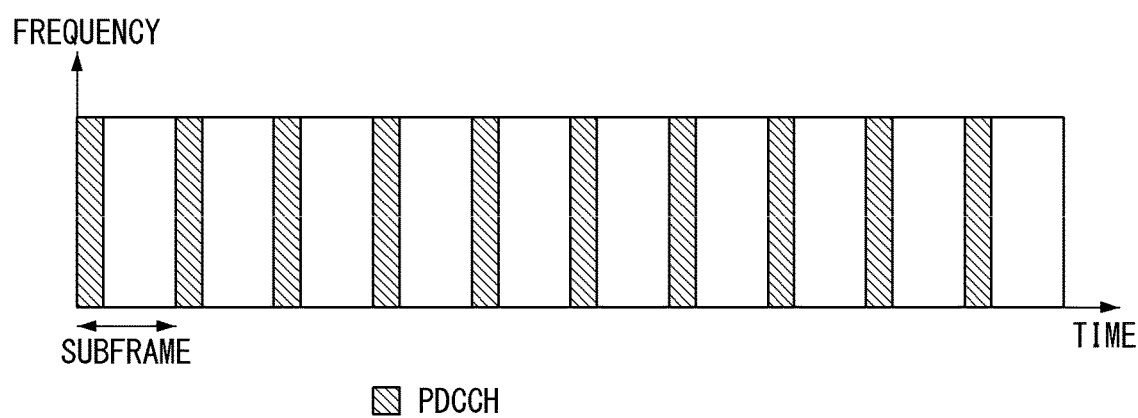
[FIG. 6]
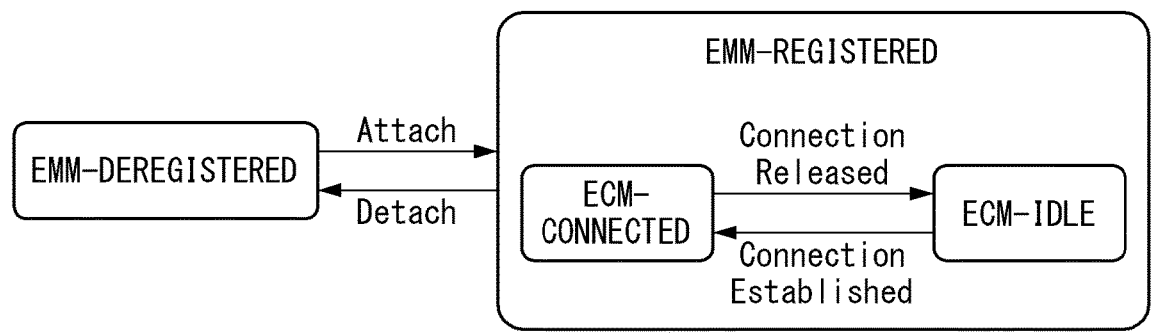

[FIG. 7]
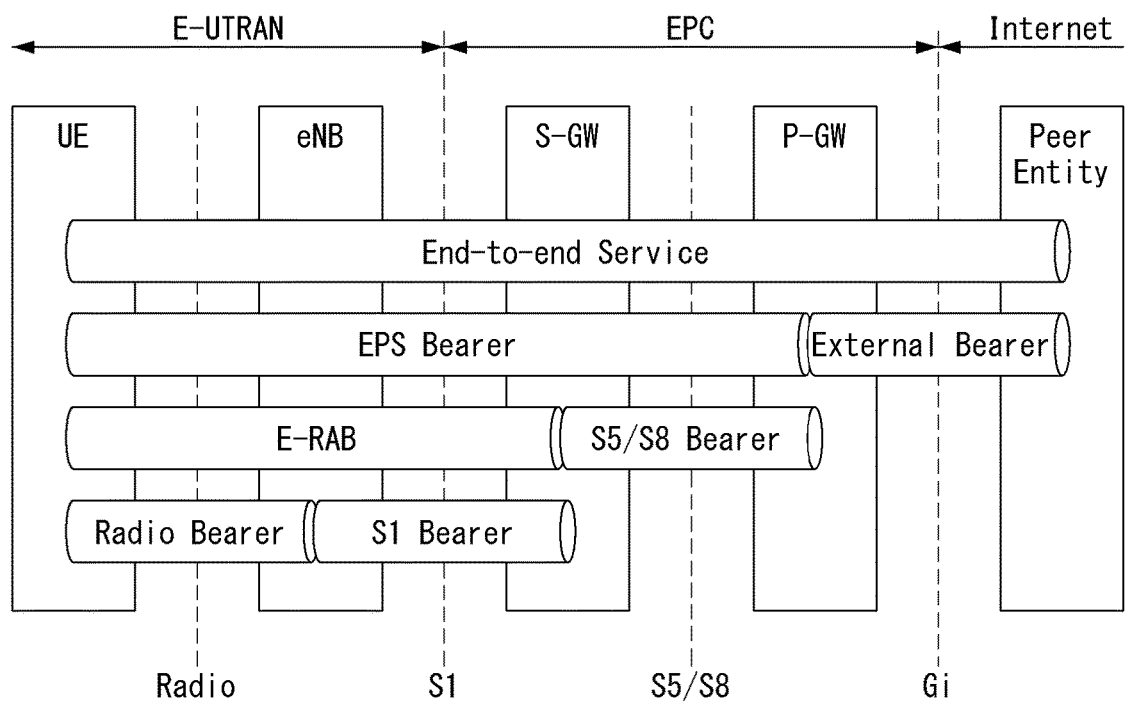

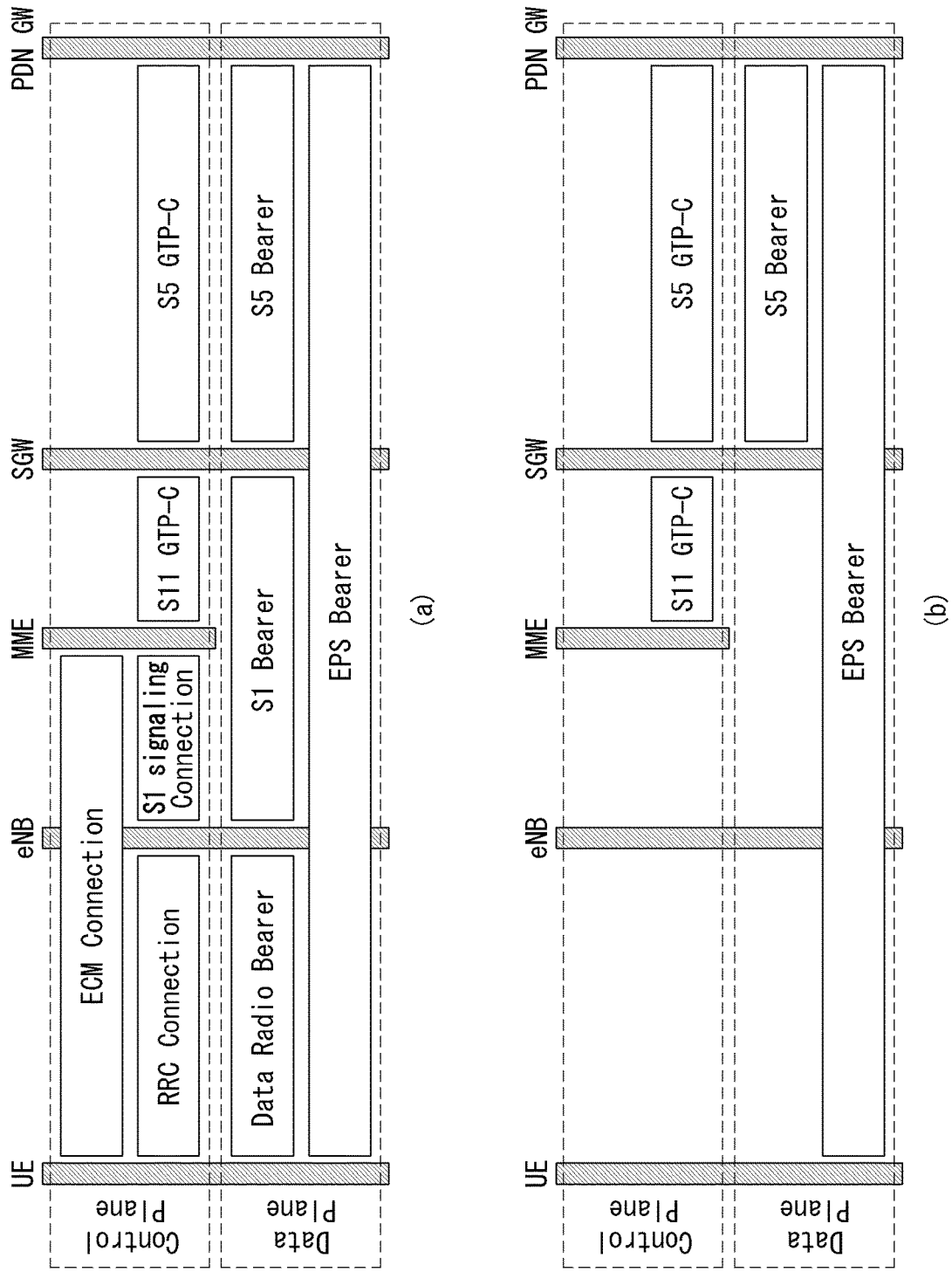
[FIG. 8]

[FIG. 9]
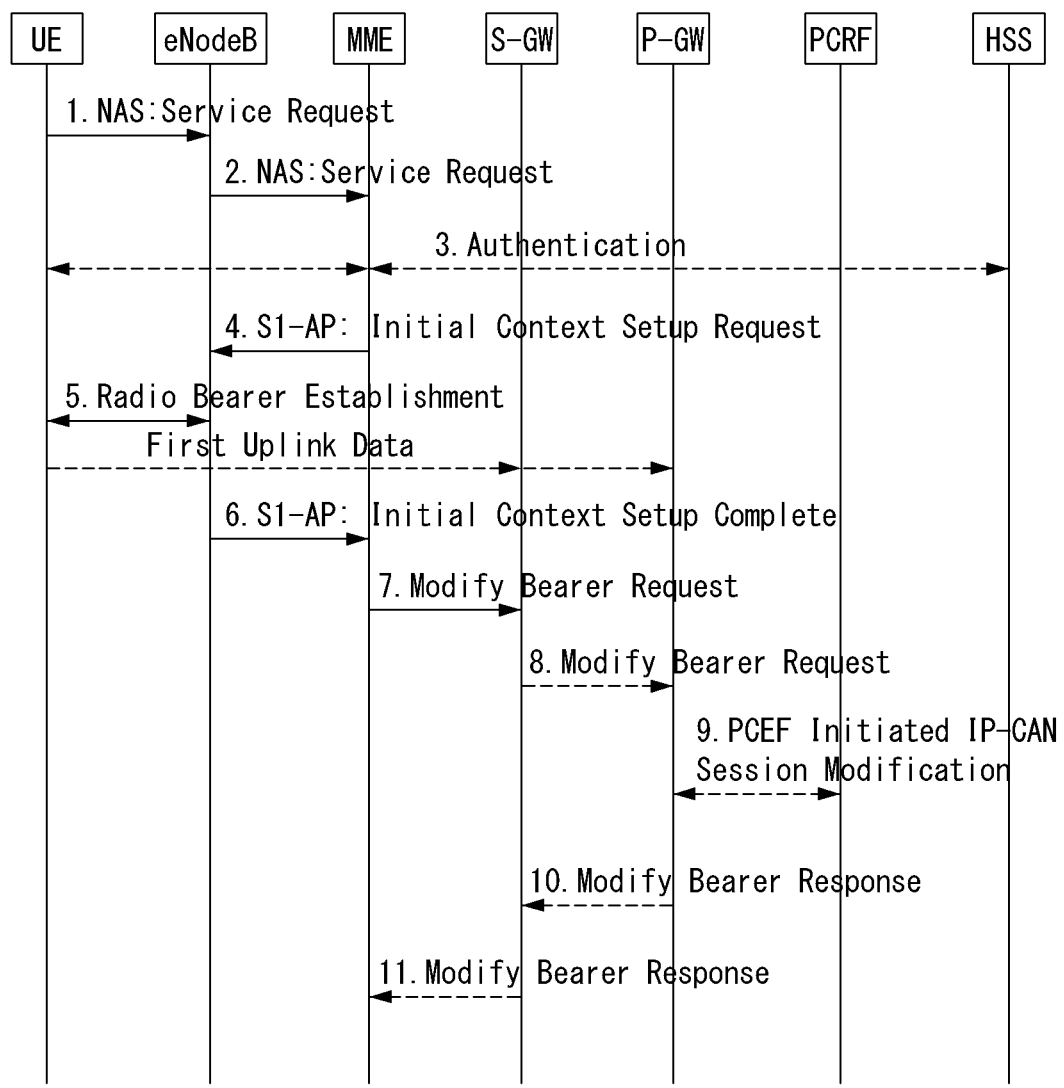

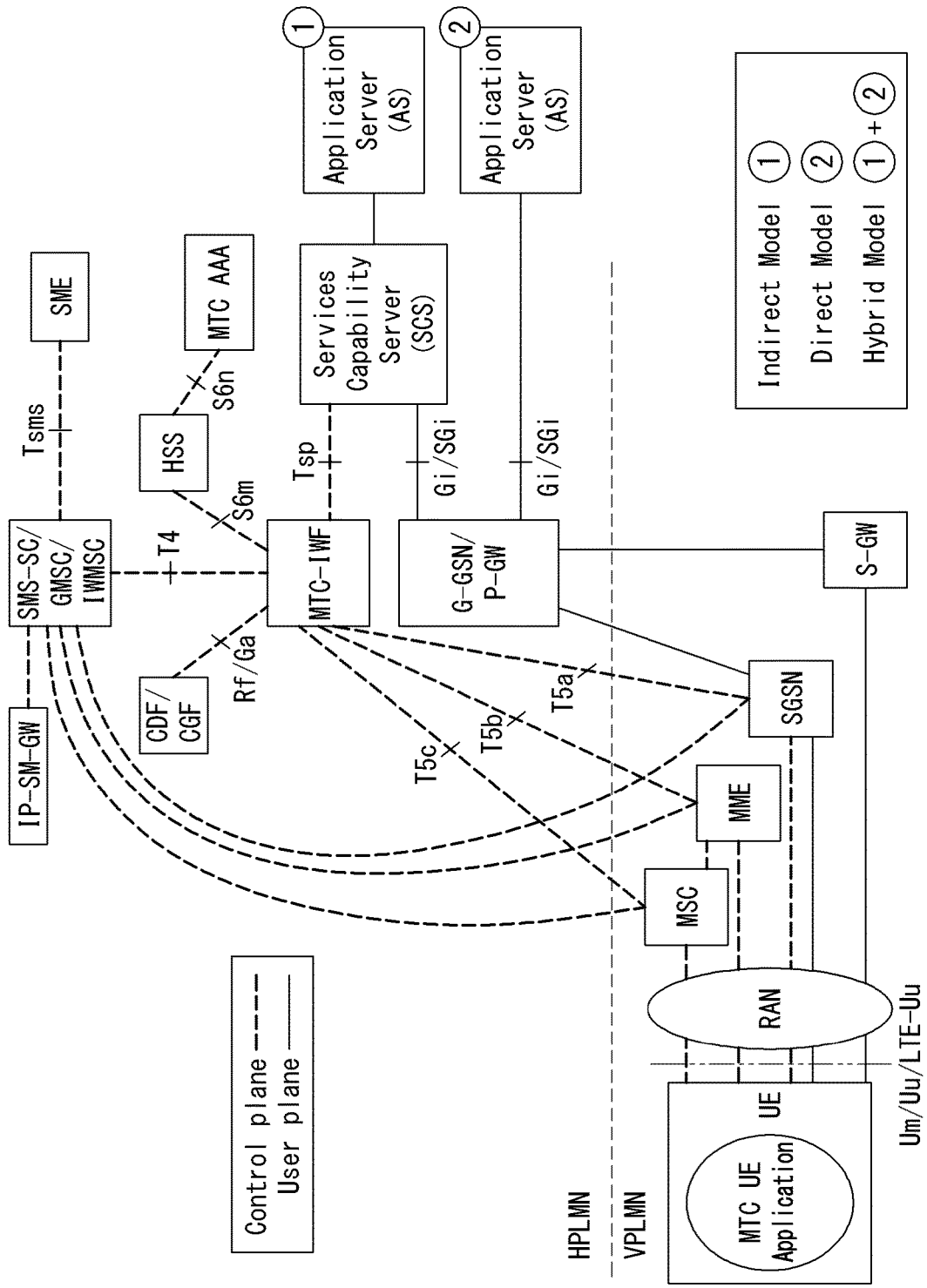
[FIG. 10]

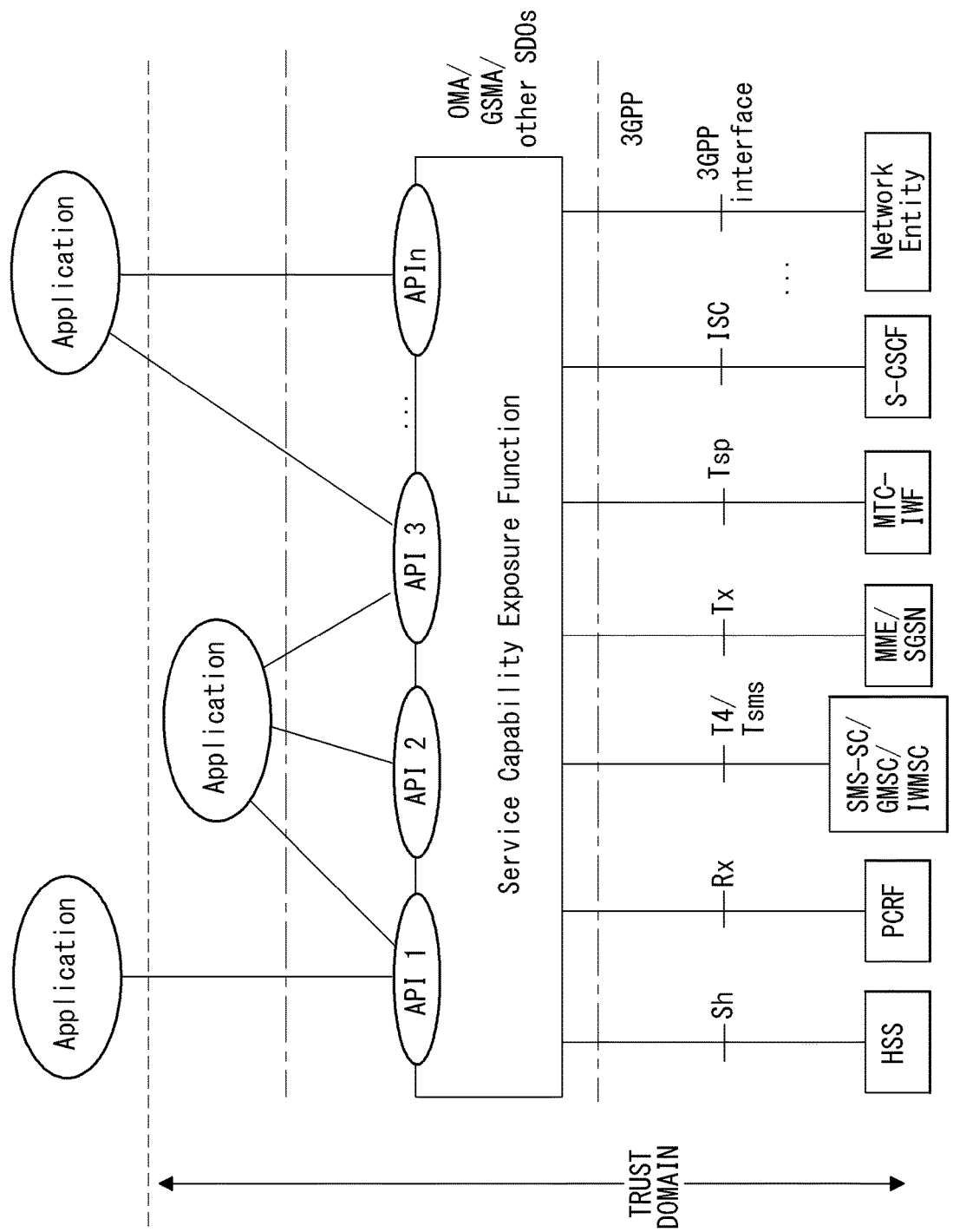
[FIG. 11]

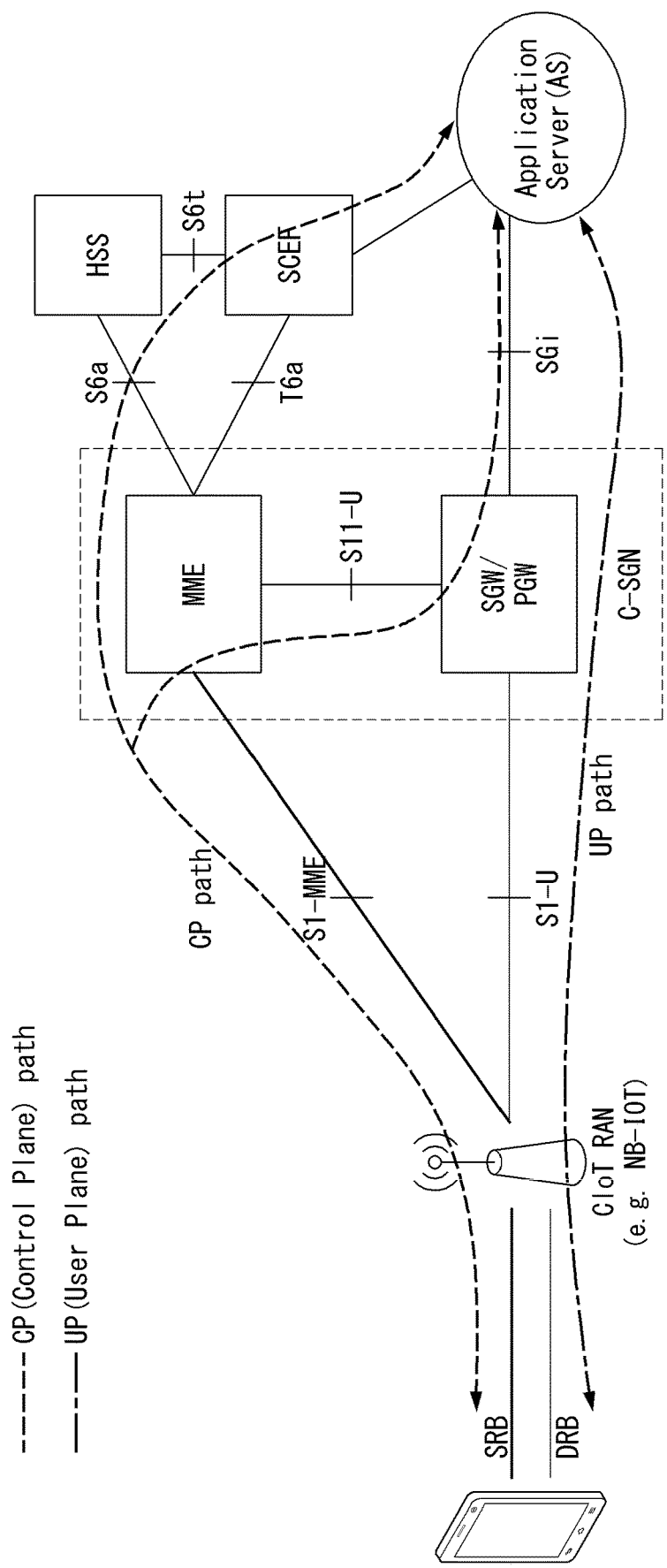
[FIG. 12]

[FIG. 13]
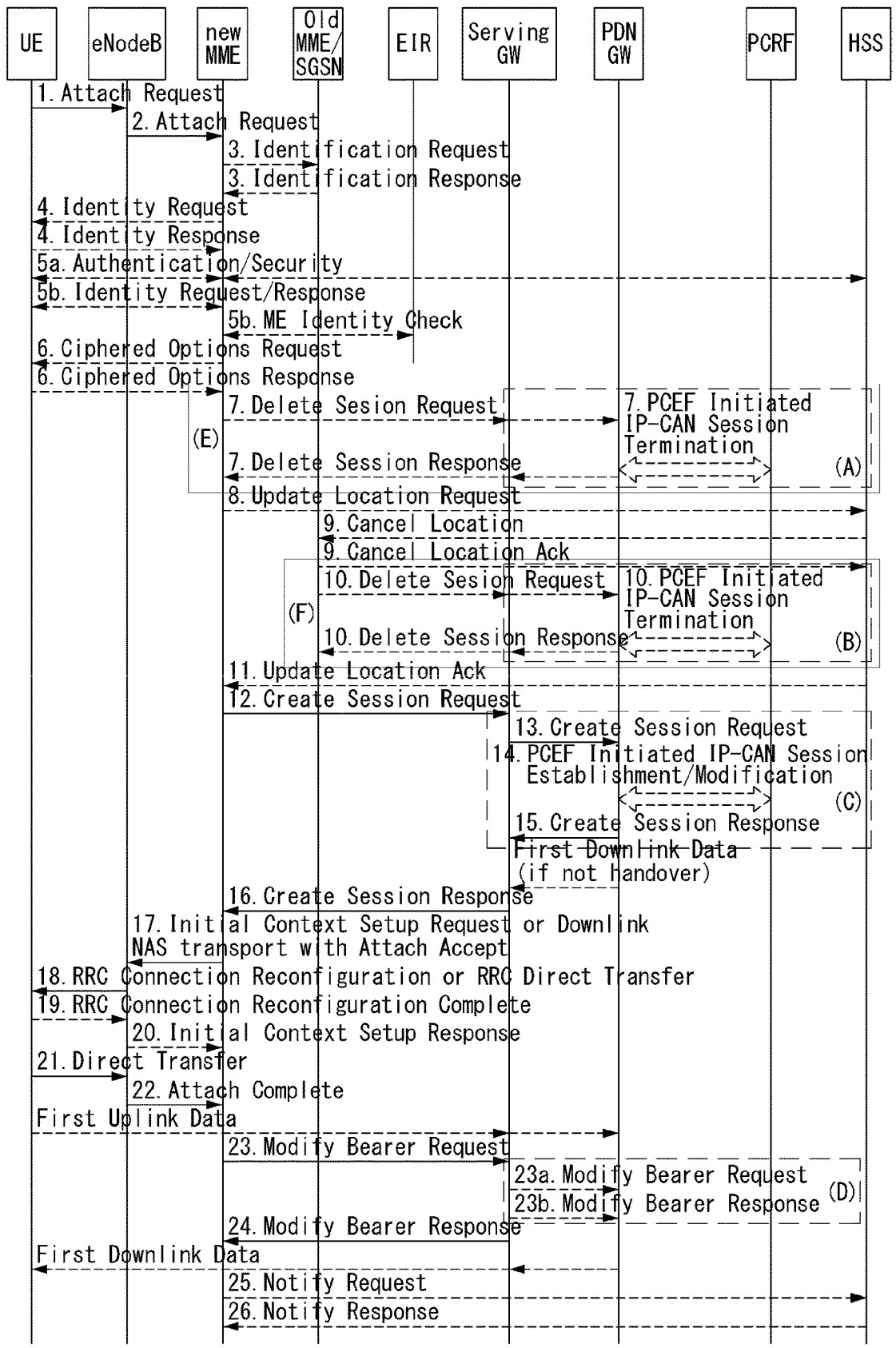

[FIG. 14]
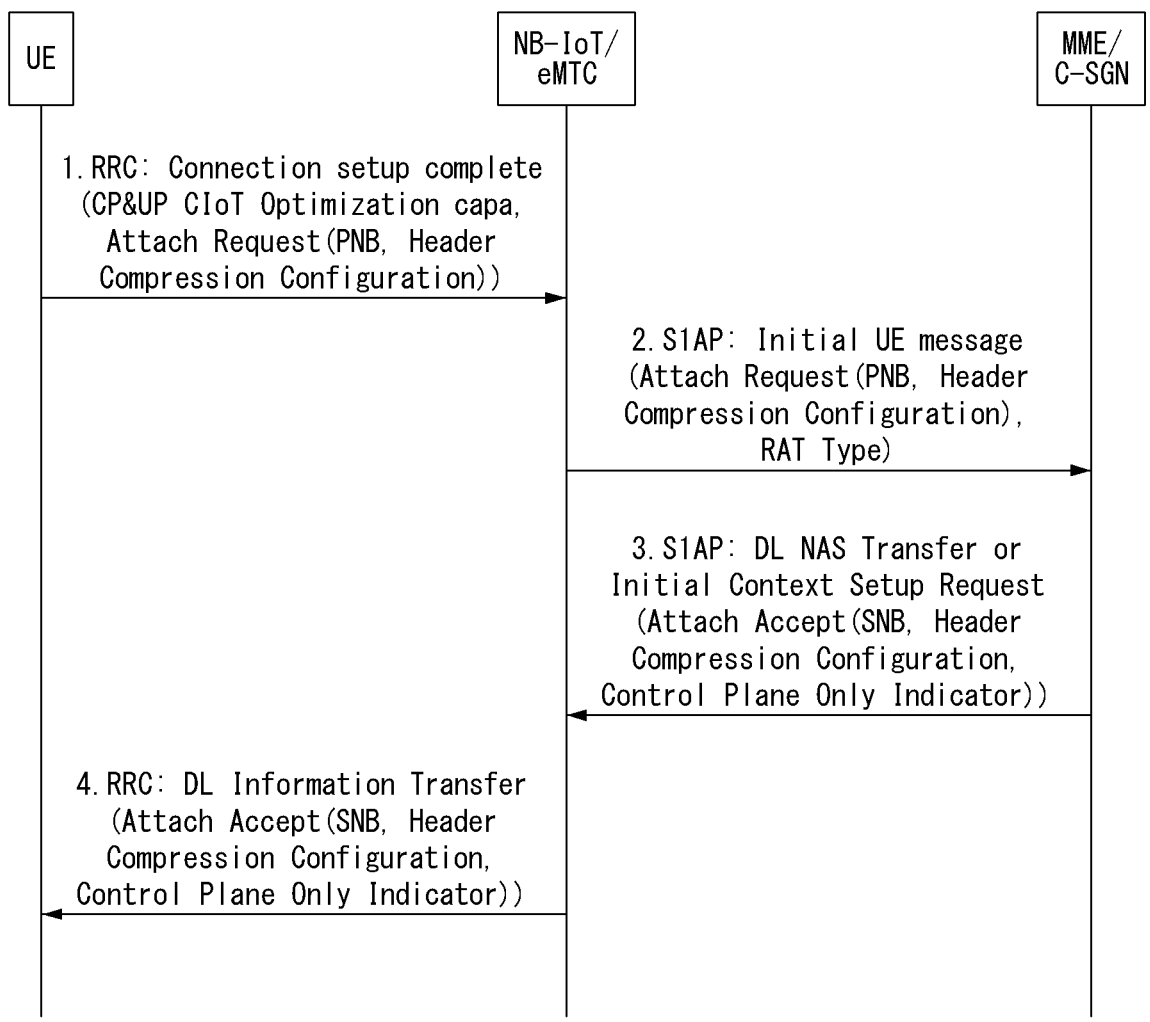

[FIG. 15]
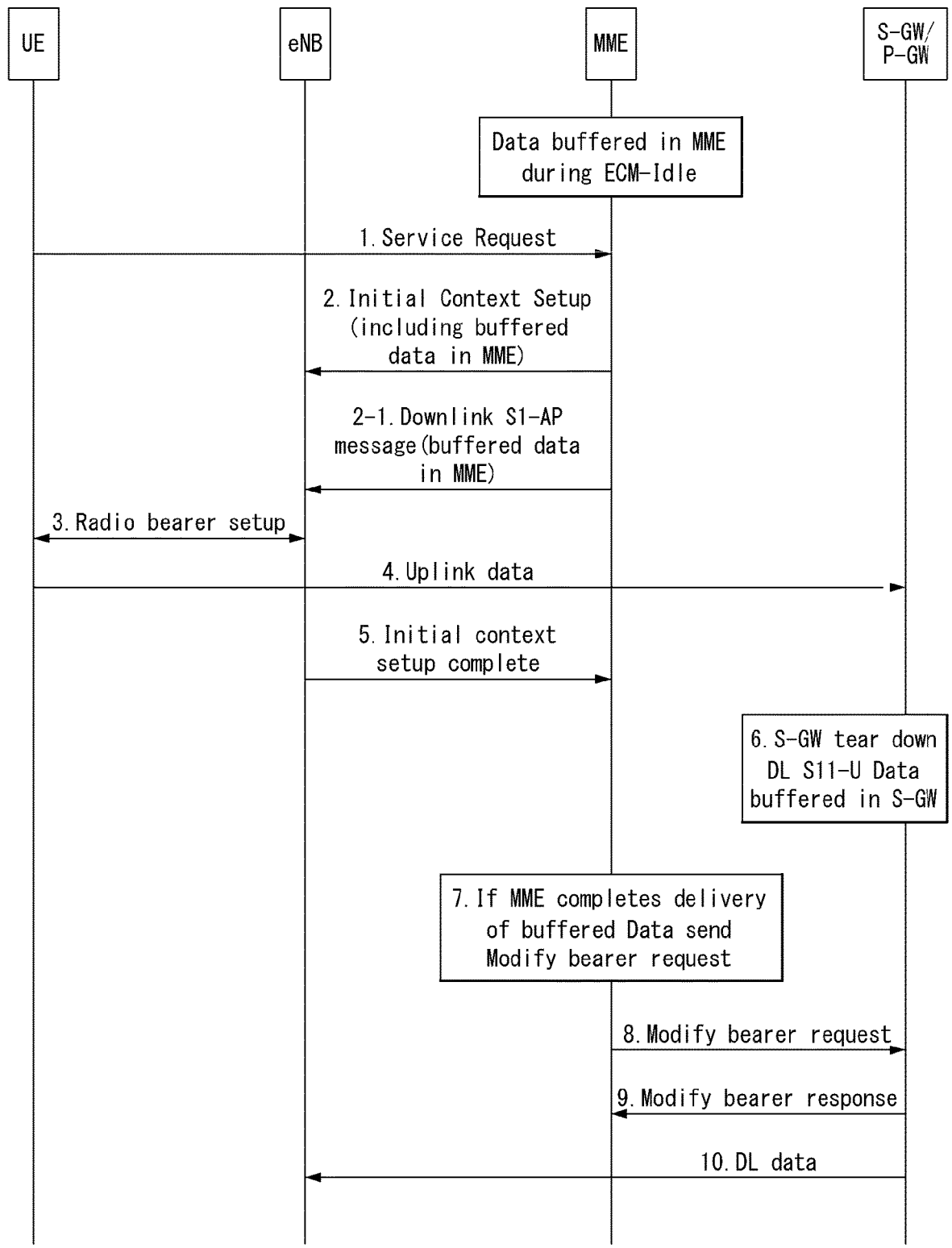

[FIG. 16]
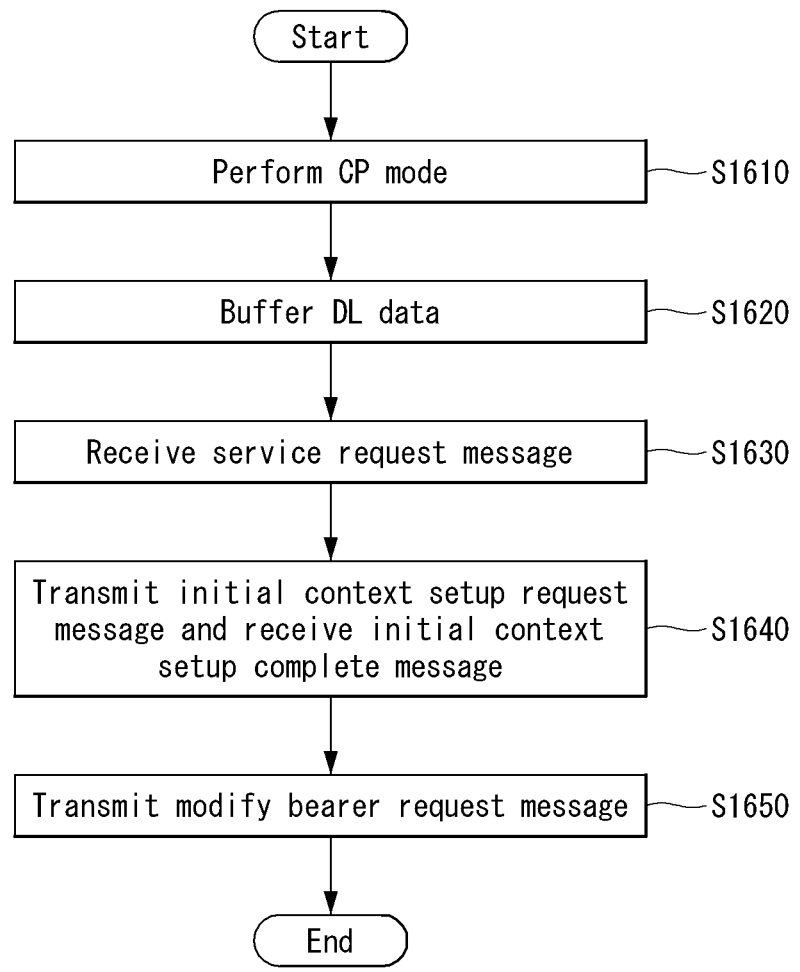
[FIG. 17]
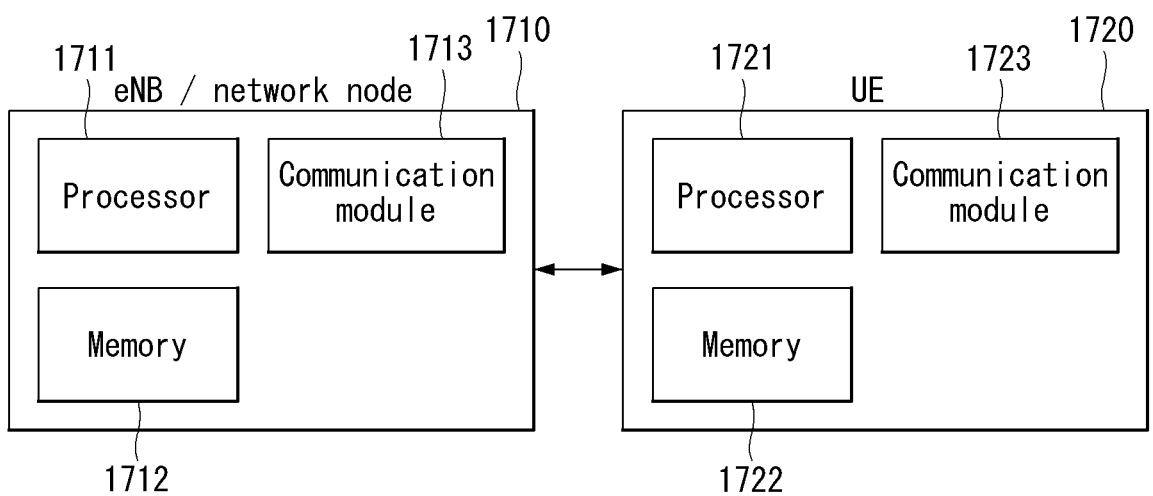

[FIG. 18]
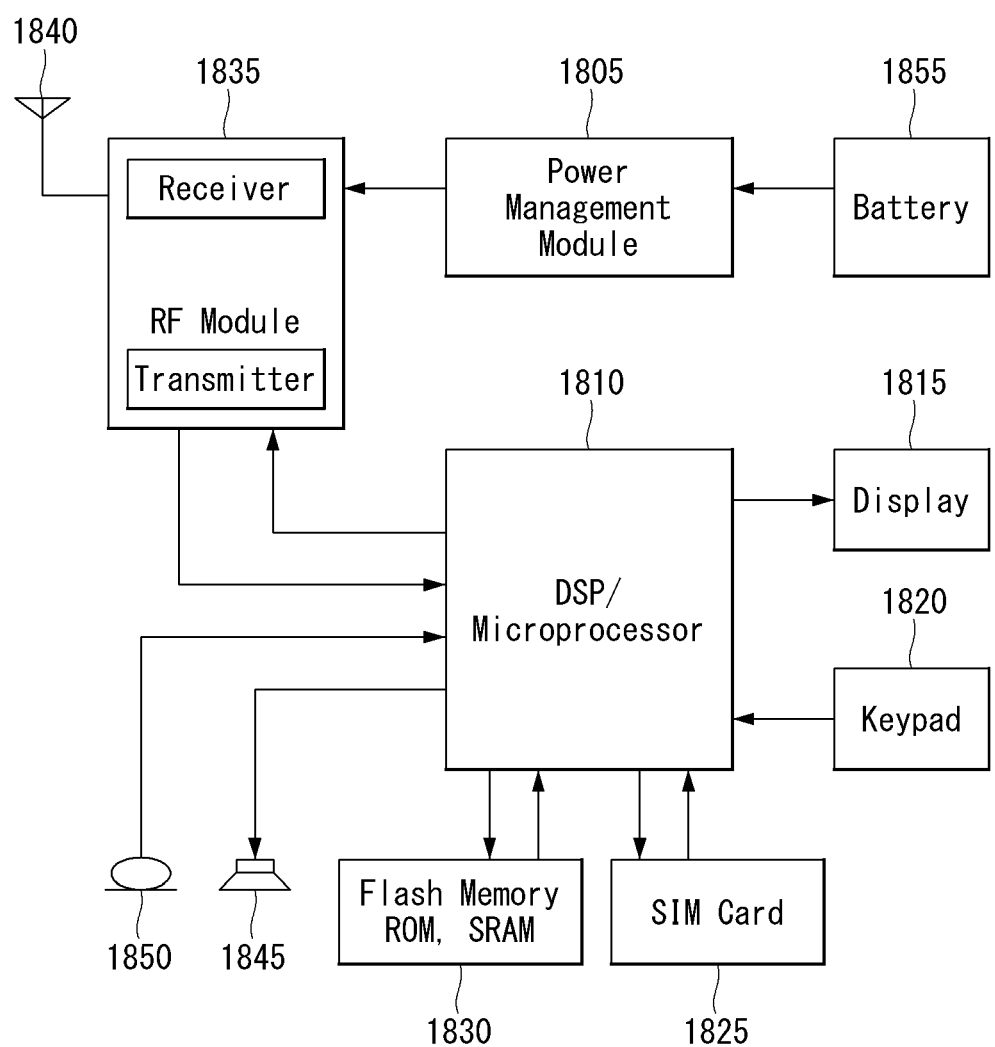

METHOD FOR TRANSMITTING BUFFERED DATA IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/003520, filed on Mar. 30, 2017, which claims the benefit of U.S. Provisional Application No. 62/315,120, filed on Mar. 30, 2016. The disclosures of the prior applications are incorporated by reference in their entirety.

TECHNICAL FIELD

The present invention relates to a method of stably transmitting data, buffered in an MME, to a terminal during the idle period of the terminal so that the sequences of the data buffered in the MME and subsequently generated data are not reversed in a wireless communication system and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

As a mode switches from a data transmission mode through a control plane to a data transmission mode through a user plane, there is a problem in that the data sequences of data buffered in an MME and data buffered in an S-GW may be reversed and may reach a terminal. An object of the present invention is to propose an efficient method for solving such a problem.

The technical objects to attain in the present disclosure are not limited to the above-described technical objects and other technical objects which are not described herein will become apparent to those skilled in the art from the following description.

Technical Solution

In an embodiment of the present invention, a method for a mobility management entity (MME) to transmit buffered data in a wireless communication system including the steps of performing a control plane (CP) mode which is a data transmission mode in which data is transmitted and received between a base station and a user equipment through a signaling radio bearer (SRB) in a control plane, buffering downlink data when the downlink data for the user equipment is received from a serving-gateway (S-GW) during an idle period in which an EPS connection management (ECM)-idle state of the user equipment is maintained, receiving, from the user equipment, a service request message to request a user plane (UP) mode which is a data transmission mode in which data is transmitted and received between the user equipment and the base station through a data radio bearer (DRB) in a user plane, transmitting, to the base station, an initial context setup request message for configuring the DRB and receiving, from the base station, an initial context setup complete message as a response to the initial context setup request message, and transmitting, to the S-GW, a Modify bearer request message for configuring an S1 bearer between the base station and the S-GW. The buffered data may be transmitted to the base station through the initial context setup request message.

Furthermore, when the remaining buffered data not transmitted through the initial context setup request message among the buffered data is present, the remaining buffered data may be transmitted to the base station through an S1-application protocol (AP) message.

Furthermore, the step of transmitting the Modify bearer request message may be performed after the transmission of the buffered data to the base station is completed.

Furthermore, the initial context setup message may further include the address of the S-GW and/or a tunnel endpoint ID (TEID).

Furthermore, the Modify bearer request message may include the address of the base station and/or a TEID.

Furthermore, the method may further include the step of receiving, from the S-GW, a Modify bearer response message as a response to the Modify bearer request message.

Furthermore, the S-GW may be a network node which stops the downlink data transmission to the MME and buffers the downlink data when uplink data is received from the user equipment in the state in which S-GW context data does not indicate a downlink user plane TEID toward the MME.

Furthermore, the data buffered in the MME may correspond to control command data of an application level.

Furthermore, a first application server which has transmitted the data buffered in the S-GW may be different from a second application server which has transmitted the data buffered in the MME.

Furthermore, the user equipment may be a user equipment not receiving a CP only indicator indicating the use of only the CP mode from the MME in the last attach procedure.

Furthermore, in another embodiment of the present invention, a mobility management entity (MME) includes a communication module for transmitting and receiving signals and a processor controlling the communication module. The processor is configured to perform a control plane (CP) mode which is a data transmission mode in which data is transmitted and received between a base station and a user equipment through a signaling radio bearer (SRB) in a control plane, buffer downlink data when the downlink data for the user equipment is received from a serving-gateway (S-GW) during an idle period in which an EPS connection management (ECM)-idle state of the user equipment is maintained, receive, from the user equipment, a service request message to request a user plane (UP) mode which is a data transmission mode in which data is transmitted and received between the user equipment and the base station through a data radio bearer (DRB) in a user plane, transmit, to the base station, an initial context setup request message for configuring the DRB and receiving, from the base station, an initial context setup complete message as a response to the initial context setup request message, and transmit, to the S-GW, a Modify bearer request message for configuring an S1 bearer between the base station and the S-GW. The buffered data may be transmitted to the base station through the initial context setup request message.

Furthermore, when the remaining buffered data not transmitted through the initial context setup request message is present in the buffered data, the remaining buffered data may be transmitted to the base station through an S1-application protocol (AP) message.

Furthermore, the processor delays a transmission occasion of the Modify bearer request message after the transmission of the buffered data to the base station is completed.

Furthermore, the S-GW may be a network node which stops the downlink data transmission to the MME and buffers the downlink data when uplink data is received from the user equipment in a state in which S-GW context data does not indicate a downlink user plane TEID toward the MME.

Furthermore, the user equipment may be a user equipment not receiving a CP only indicator indicating an use of only the CP mode from the MME in a last attach procedure.

Advantageous Effects

In accordance with an embodiment of the present invention, there is an effect in that unnecessary operations, such as the execution of retransmission of a packet and the redeployment (or reordering) of data sequences of an eNB/UE occurring when the data sequences are reversed, do not need to be additionally performed because data reaches a terminal in a proper sequence.

Effects which may be obtained in the present invention are not limited to the aforementioned effect, and other technical effects not described above may be evidently understood by a person having ordinary skill in the art to which the present invention pertains from the following description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention may be applied.

FIG. 2 illustrates an example of evolved universal terrestrial radio access network structure to which the present invention may be applied.

FIG. 3 exemplifies a structure of E-UTRAN and EPC in a wireless communication system to which the present invention may be applied.

FIG. 4 illustrates the structure of a radio interface protocol between a UE and E-UTRAN in a wireless communication system to which the present invention may be applied.

FIG. 5 is a diagram schematically showing the structure of a physical channel in a wireless communication system to which the present invention may be applied.

FIG. 6 is a diagram illustrating EMM and ECM states in a wireless communication system to which the present invention may be applied.

FIG. 7 illustrates a bearer structure in a wireless communication system to which the present invention may be applied.

FIG. 8 is a diagram illustrating the transmission path of a control plane and user plane in the EMM registration state in a wireless communication system to which the present invention may be applied.

FIG. 9 is a diagram illustrating a UE trigger service request procedure in a wireless communication system to which the present invention may be applied.

FIG. 10 is a diagram exemplifying machine-type communication (MTC) architecture in a wireless communication system to which the present invention may be applied.

FIG. 11 exemplifies architecture for service capability exposure in a wireless communication system to which the present invention may be applied.

FIG. 12 is a diagram illustrating a data transmission and reception method for a CIoT device to which the present invention may be applied.

FIG. 13 is a flowchart illustrating an attach procedure according to an embodiment of the present invention.

FIG. 14 illustrates an attach procedure for CIoT EPS optimization to which the present invention may be applied.

FIG. 15 is a flowchart illustrating a service request procedure according to an embodiment of the present invention.

FIG. 16 is a flowchart illustrating a buffered data transmission method of an MME according to an embodiment of the present invention.

FIG. 17 illustrates a block configuration of a communication apparatus according to an embodiment of the present invention.

FIG. 18 illustrates a block configuration of a communication apparatus according to an embodiment of the present invention.

BEST MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

For some cases, to avoid obscuring the technical principles of the present invention, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Furthermore, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention may be supported by the documents above. Furthermore, all of the terms disclosed in this document may be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It may be installed inside or outside a mobile communication network. It can provide an interface through which an MTC user can access the server. Furthermore, an MTC server can provide MTC-related services to other servers (in the form of Services Capability Server (SCS)) or the MTC server itself may be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN may be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to Which the Present Invention May Be Applied

FIG. 1 illustrates an Evolved Packet System (EPS) to which the present invention may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Furthermore, in case the UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Furthermore, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Furthermore, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Furthermore, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Furthermore, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention may be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention may be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention may be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Furthermore, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Furthermore, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be present in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention may be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol(s) of subframe (e.g., the first symbol of subframe) may be used for PDCCH. The PDCCH carries information for resources which are dynamically allocated (e.g., resource block, modulation and coding scheme (MCS), etc.).

EMM and ECM States

An EPS mobility management (EMM) state and an EPS connection management (ECM) state are described.

FIG. 6 is a diagram illustrating EMM and ECM states in a wireless communication system to which the present invention may be applied.

Referring to FIG. 6, in order for the NAS layer located in the control plane of a UE and MME to manage the mobility of the UE, an EMM-REGISTERED state and an EMM-DEREGISTERED state may be defined depending on whether the UE has been attached to or detached from a network. The EMM-REGISTERED state and the EMM-DEREGISTERED state may be applied to the UE and the MME.

As in the case where a UE is first powered on, at the early stage, the UE is in the EMM-DEREGISTERED state. In order to access a network, the UE performs a process of registering it with the corresponding network through an initial attach procedure. When the attach procedure is successfully performed, the UE and the MME make transition to the EMM-REGISTERED state. Furthermore, if the UE is powered off or a radio link failure occurs (if a packet error rate exceeds a reference value in the radio link), the UE is detached from the network and makes transition to the EMM-DEREGISTERED state.

Furthermore, in order to manage a signaling connection between the UE and the network, an ECM-CONNECTED state and an ECM-IDLE state may be defined. The ECM-CONNECTED state and the ECM-IDLE state may also be applied to the UE and the MME. The ECM connection is configured as an RRC connection set between the UE and the eNB and as an S1 signaling connection set between the eNB and the MME. That is, what the ECM connection has been configured/released means that both the RRC connection and the S1 signaling connection have been configured/released.

The RRC state indicates whether the RRC layer of a UE and the RRC layer of an eNB have been logically connected. That is, if the RRC layer of the UE and the RRC layer of the eNB have been connected, the UE is in the RRC_CONNECTED. If the RRC layer of the UE and the RRC layer of the eNB have not been connected, the UE is in the RRC_IDLE state.

A network can check the presence of a UE in the ECM-CONNECTED state in a cell unit and can effectively control the UE.

In contrast, the network is unable to check the presence of a UE in the ECM-IDLE state, a core network (CN) performs management in a tracking area unit, that is, an area unit greater than a cell. When the UE is in the ECM-IDLE state, the UE performs discontinuous reception (DRX) configured by the NAS using an uniquely allocated ID in the tracking area. That is, the UE may receive the broadcasting of system information and paging information by monitoring a paging signal in a specific paging occasion every UE-specific paging DRX cycle.

Furthermore, when the UE is in the ECM-IDLE state, the network does not have context information of the UE. Accordingly, the UE in the ECM-IDLE state may perform a UE-based mobility-related procedure, such as cell selection or cell reselection, without a need to receive the command of the network. If the location of the UE in the ECM-IDLE state is different from the location known by the network, the UE may notify the network of the location of the corresponding UE through a tracking area update (TAU) procedure.

In contrast, when the UE is in the ECM-CONNECTED state, the mobility of the UE is managed by the command of the network. In the ECM-CONNECTED state, the network is aware of a cell to which the UE belongs. Accordingly, the network may transmit and/or receive data to the UE or from the UE, may control mobility such as the handover of the UE, and may perform cell measurement for a surrounding cell.

As described above, in order for the UE to receive common mobile communication service such as voice or data, it needs to shift to the ECM-CONNECTED state. As in the case where the UE is first powered on, the UE is initially in the ECM-IDLE state like the EMM state. When the UE is successfully registered with a corresponding network through an initial attach procedure, the UE and the MME make transition to the ECM-CONNECTED state. Furthermore, if the UE has been registered with the network and radio resources have not been allocated to the UE because traffic has been deactivated, the UE is in the ECM-IDLE state. When new uplink or downlink traffic is generated in the corresponding UE, the UE and the MME make transition to the ECM-CONNECTED state through a service request procedure.

FIG. 7 illustrates a bearer structure in a wireless communication system to which the present invention may be applied.

When a UE is connected to a packet data network (PDN) (a peer entity in FIG. 6), a PDN connection is generated. The PDN connection may also be called an EPS session. The PDN is an Internet protocol (IP) network inside or outside a service provider and provides the Internet or a service function, such as an IP multimedia subsystem (IMS).

The EPS session has one or more EPS bearers. The EPS bearer is the transmission path of traffic generated between a UE and a PDN GW in order for an EPS to transfer user traffic. One or more EPS bearers may be configured per UE.

Each EPS bearer may be divided into an E-UTRAN radio access bearer (E-RAB) and an S5/S8 bearer. The E-RAB may be divided into a radio bearer (RB) and an S1 bearer. That is, one EPS bearer corresponds to one RB, S1 bearer, S5/S8 bearer.

The E-RAB transfers a packet of an EPS bearer between a UE and the EPC. If the E-RAB is present, an E-RAB bearer and an EPS bearer are mapped in a one-to-one manner. A data radio bearer (DRB) transfers a packet of an EPS bearer between the UE and an eNB. If the DRB is present, the DRB and the EPS bearer/E-RAB are mapped in a one-to-one manner. The S1 bearer transfers a packet of the EPS bearer between the eNB and an S-GW. The S5/S8 bearer transfer a packet of the EPS bearer between the S-GW and a P-GW.

The UE binds a service data flow (SDF) with an EPS bearer in an uplink direction. The SDF is an IP flow in which user traffic has been classified (or filtered) for each service or a collection of IP flows. A plurality of SDFs includes a plurality of uplink packet filters and may be multiplexed with the same EPS bearer. The UE stores mapping information between an uplink packet filter and a DRB in order to bind an SDF and a DRB in uplink.

The P-GW binds an EPS bearer in a downlink direction with an SDF. A plurality of SDFs includes a plurality of downlink packet filters and may be multiplexed with the same EPS bearer. The P-GW stores mapping information between a downlink packet filter and an S5/S8 bearer in order to bind an SDF and an S5/S8 bearer in downlink.

The eNB stores one-to-one mapping between the DRB and the S1 bearer in order to bind the DRB and the S1 bearer in uplink/downlink. The S-GW stores one-to-one mapping information between the S1 bearer and the S5/S8 bearer in order to bind the S1 bearer and the S5/S8 bearer in uplink/downlink.

The EPS bearer is divided into two types of a default bearer and a dedicated bearer. The UE may have one default bearer and one or more dedicated bearers per PDN. A minimum default bearer having an EPS session with respect to one PDN is called a default bearer.

The EPS bearer may be classified based on an identity. The EPS bearer identity is assigned by the UE or the MME. A dedicated bearer(s) is combined with a default bearer by a linked EPS bearer identity (LBI).

When the UE is initially attached to a network through an initial attach procedure, an IP address is assigned to the UE, thus a PDN connection is generated and a default bearer is generated in an EPS period. Although there is no traffic between the UE and a corresponding PDN, the default bearer is maintained without being released unless the PDN connection is terminated. When the corresponding PDN connection is terminated, the default bearer is released. In this case, the UE and bearers of the entire period configuring the default bearer are not activated, but an S5 bearer directly connected to the PDN is maintained and an E-RAB bearer (i.e., DRB and S1 bearer) associated with a radio resource is released. Furthermore, when new traffic occurs in the corresponding PDN, an E-RAB bearer is reconfigured and transfers the traffic.

If the UE uses a service (e.g., video on demand (VoD)) insufficient to receive quality of service (QoS) through only a default bearer while using a service (e.g., the Internet) through the default bearer, a dedicated bearer is generated when the UE requests (on-demand) the dedicated bearer. The dedicated bearer is released if there is no traffic of the UE. The UE or a network may generate a plurality of dedicated bearers, if necessary.

An IP flow may have a different QoS characteristic depending on that a UE uses which service. A network determines a control policy for the assignment of a network resource to QoS when it sets up/modifies an EPS session for a UE, and applies the control policy while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a UE. IP flows having the same QoS are mapped to the same SDF. The SDF becomes a unit for applying the PCC rule.

A policy and charging control function (PCRF) and a policy and charging enforcement function (PCEF) may correspond to major entities performing such a PCC function.

The PCRF determines a PCC rule for each SDF when an EPS session is generated and changed, and provides it to the P-GW (or PCEF). The P-GW configures a PCC rule for a corresponding SDF, detects an SDF whenever IP packets are transmitted/received, and applies the PCC rule to the corresponding SDF. When the SDF is transmitted to the UE via the EPS, it is mapped to an EPS bearer capable of providing suitable QoS according to a QoS rule stored in the P-GW.

The PCC rule is divided into a dynamic PCC rule and a predefined PCC rule. The dynamic PCC rule is dynamically provided from the PCRF to the P-GW when an EPS session is set up/modified. In contrast, the predefined PCC rule is pre-configured in the P-GW and activated/deactivated by the PCRF.

The EPS bearer includes a QoS class identifier (QCI) and an allocation and retention priority (ARP) as default QoS parameters.

The QCI is a scalar used as a criterion for accessing node-specific parameters that control bearer level packet forwarding treatment. A scalar value is pre-configured by a network operator. For example, the scalar may be pre-configured as one of integer values 1 to 9.

A major object of an ARP is for determining whether the setup or modification request of a bearer may be accepted or should be rejected if a resource is limited. Furthermore, the ARP may be used to determine that which bearer(s) will be dropped by an eNB in an exceptional resource restriction (e.g., handover) situation.

The EPS bearer is divided into a guaranteed bit rate (GBR) type bearer and a non-GBR type bearer depending on a QCI resource form. A default bearer may be always a non-GBR type bearer, and a dedicated bearer may be a GBR type or non-GBR type bearer.

The GBR type bearer has a GBR and a maximum bit rate (MBR) as QoS parameters in addition the QCI and the ARP. The MBR means that a fixed resource is assigned for each bearer (bandwidth is guaranteed). In contrast, the non-GBR type bearer has an aggregated MBR (AMBR) as a QoS parameter in addition to the QCI and the ARP. The AMBR means that a maximum bandwidth that may be used along with other non-GBR type bearers without the assignment of a resource for each bearer is assigned.

If QoS of an EPS bearer is determined as described above, QoS of each bearer is determined for each interface. The bearer of each interface provides QoS of the EPS bearer for each interface, so an EPS bearer, an RB, and S1 bearer, etc. have a one-to-one relation.

If a UE uses a service insufficient to receive QoS through only a default bearer while using a service through the default bearer, a dedicated bearer is generated at the request of the UE (on-demand).

FIG. 8 is a diagram illustrating the transmission path of a control plane and user plane in the EMM registration state in a wireless communication system to which the present invention may be applied.

FIG. 8(a) illustrates the ECM-CONNECTED state, and FIG. 8(b) illustrates ECM-IDLE.

When a UE is successfully attached to a network and becomes the EMM-Registered state, it is provided with a service using an EPS bearer. As described above, the EPS bearer is divided into a DRB, an S1 bearer, and an S5 bearer for each period.

As in FIG. 8(a), an NAS signaling connection, that is, an ECM connection (i.e., RRC connection and S1 signaling connection), is set up in the ECM-CONNECTED state having user traffic. Furthermore, an S11 GPRS tunneling protocol control plane (GTP-C) connection, is set up between an MME and an SGW. An S5 GTP-C connection is set up between the SGW and a PDN GW.

Furthermore, in the ECM-CONNECTED state, all of the DRB, the S1 bearer and the S5 bearer are configured (i.e., a radio or network resource assigned).

As in FIG. 8(b), in the ECM-IDLE state not having user traffic, an ECM connection (i.e., RRC connection and S1 signaling connection) is released. In this case, an S11 GTP-C connection between an MME and an SGW and an S5 GTP-C connection between the SGW and a PDN GW is maintained.

Furthermore, in the ECM-IDLE state, both a DRB and an S1 bearer are released, but the configuration of an S5 bearer is maintained (i.e., a radio or a network resource assigned).

Service Request Procedure

FIG. 9 is a diagram illustrating a UE trigger service request procedure in a wireless communication system to which the present invention may be applied.

1-2. A UE starts a UE-triggered Service Request procedure by transmitting a Service Request message to an MME.

The Service Request message is forwarded by being included in an RRC Connection Setup Complete message in an RRC connection, and forwarded by being included in an Initial UE message in an S1 signaling connection.

3. The MME requests and receives information for authentication to an HSS for UE authentication, and performs mutual authentication with the UE.

4. The MME transmits an Initial Context Setup Request message to an eNB such that the eNB configures S1 bearer with an S-GW and configures a DRB with the UE.

5. The eNB transmits an RRC Connection Reconfiguration message to the UE in order to generate a DRB.

When this procedure is ended, a DRB generation between the eNB and the UE is completed and all of uplink EPS bearers are configured throughout the UE to a P-GW.

6. The eNB transmits an Initial Context Setup Complete message including 'S1 eNB TEID (tunnel endpoint ID)' to the MME in response to the Initial Context Setup Request message.

7. The MME forwards the 'S1 eNB TEID' received from the eNB to the S-GW through a Modify Bearer Request message.

When this procedure is ended, the generation of downlink S1 bearer between the eNB and the S-GW is completed and all of downlink EPS bearers are configured throughout the P-GW to the UE. The UE may receive downlink traffic from the P-GW.

8. If a cell (E-UTRAN Cell Global Identifier; ECGI) or a tracking area (TAI) in which the UE is located is changed, the S-GW transmits the Modify Bearer Request message and notifies it to the P-GW.

9. If it is required, the P-GW may perform an IP connectivity access network (IP-CAN) session modification procedure with a PCRF.

10. When the P-GW receives the Modify Bearer Request message from the S-GW, the P-GW transmits a Modify Bearer Response message to the S-GW in response to it.

11. The S-GW transmits the Modify Bearer Response message to the MME in response to the Modify Bearer Request message.

Generally, a Network-triggered Service Request procedure is performed when a network is intended to transmit downlink data to the UE in an ECM-IDLE state.

The UE is available to transmit/receive UL/DL data with the S-GW through the established RRC connection.

Next, if a release condition of the RRC connection is satisfied (e.g., if a particular timer expires or a specific time passes), the eNB may transmit an S1-AP (Application Protocol) UE Context Release Request (S1-AP UE Ctxt Release Req) message for releasing an RRC connection to the MME. And then, the MME may transmit a Release Access Bearers Request message (Release Access Bearers Req) for releasing an access bearer connection to the S-GW, and in response to it, may receives a Release Access Bearer Response message (Release Access Bearers Resp) from the S-GW. Next, the MME may transmit an S1-AP UE Context Release Command message to the eNB. As a result, the RRC connection between the eNB and the UE may be released.

Lastly, the eNB may transmit an S1-AP UE Context Release Complete message notifying that the RRC connection release is completed to the MME.

Machine-Type Communication (MTC)

FIG. 10 is a diagram exemplifying machine-type communication (MTC) architecture in a wireless communication system to which the present invention may be applied.

An end-to-end application between a UE (or MTC UE) used for MTC and an MTC application may adopt services provided in the 3GPP system and the optional services provided to an MTC server. The 3GPP system may provide transport and communication services (including 3GPP bearer services, IMS, and SMS) including various optimizations to facilitate the MTC.

FIG. 10 illustrates that the UE used for the MTC is connected to a 3GPP network (UTRAN, E-UTRAN, GERAN, I-WLAN, etc.) through an Um/Uu/LTE-Uu interface. The architecture of FIG. 10 includes various MTC models (Direct, Indirect, and Hybrid models).

First, entities illustrated in FIG. 10 will be described.

In FIG. 10, the application server is a server on the network where the MTC application is executed. Techniques for implementing various MTC applications described above may be applied to the MTC application server and a detailed description thereof will be omitted. Further, the MTC application server may access the MTC server through a reference point API, and a detailed description thereof will be omitted. Alternatively, the MTC application server may be collocated with the MTC server.

The MTC server (e.g., an SCS server) is a server on the network that manages the MTC terminal and may communicate with the UE and PLMN nodes connected to the 3GPP network and used for the MTC.

An MTC-interworking function (MTC-IWF) may manage interworking between the MTC server and an operator core network and act as a proxy for the MTC operation. In order to support an MTC indirect or hybrid model, the MTC-IWF may relay or interpret a signaling protocol on a reference point Tsp to enable a specific function in the PLMN. The MTC-IWF performs a function of authenticating the MTC server before the MTC server establishes communication with the 3GPP network, a function of authenticating a control plane request from the MTC server, various functions related to a trigger instruction described later, etc.

Short Message Service-Service Center (SMS-SC)/Internet Protocol Short Message Gateway (IP-SM-GW) may manage transmission and reception of the short message service (SMS). The SMS-SC may be responsible for relaying, storing, and delivering short messages between a short message entity (SME) (an entity transmitting or receiving short messages) and the UE. The IP-SM-GW may take charge of protocol interoperability between a IP-based UE and the SMS-SC.

Charging data function (CDF)/charging gateway function (CGF) may perform charging-related operations.

The HLR/HSS may serve to store subscriber information (IMSI, etc.), routing information, configuration information, etc., and provide the subscriber information (IMSI, etc.), routing information, configuration information, etc., to the MTC-IWF.

The MSC/SGSN/MME may perform control functions including mobility management, authentication, resource allocation, etc., for network connection of the UE. The MSC/SGSN/MME may perform a function of receiving the trigger instruction from the MTC-IWF and processing the received trigger instruction in the form of the message to be provided to the MTC UE in association with the triggering described later.

The gateway GPRS support node (GGSN)/serving-gateway (S-GW)+packet date network-gateway (P-GW) may perform a gateway function of taking charge of connection between a core network and an external network.

In Table 2, main reference points in FIG. 10 are summarized.

TABLE 2

| Reference point | Description |
| --- | --- |
| Tsms | Reference point used for an entity outside the 3GPP system to communicate with the MTC UE via the SMS |
| Tsp | Reference point used for the entity outside the 3GPP system to communicate with the MTC-IWF in association with control plane signaling |
| T4 | Reference point used by the MTC-IWF to route device triggers to the SMS-SC of the HPLMN |
| T5a | Reference point between the MTC-IWF and a serving SGSN |
| T5b | Reference point between the MTC-IWF and a serving MME |
| T5c | Reference point between the MTC-IWF and a serving MSC |
| S6m | Reference point used by the MTC-IWF to inquire identification information (E.164 Mobile Station International Subscriber Directory Number (MSISDN) or IMSI mapped to an external identifier) of the UE and to collect UE accessibility and configuration information |

In Table 2, at least one of the reference points T5a, T5b, and T5c is referred to as T5.

Meanwhile, user plane communication with the MTC server in the case of the indirect and hybrid models and communication with the MTC application server in the case of the direct and hybrid models may be performed using the existing protocol through the reference points Gi and SGi.

Specific details related to the contents described in FIG. 10 may be incorporated into the present document by reference of 3GPP TS 23.682 document.

FIG. 11 exemplifies architecture for service capability exposure in a wireless communication system to which the present invention may be applied.

The architecture for the service capability exposure illustrated in FIG. 11 illustrates that the 3GPP network securely exposes services and capabilities thereof provided by the 3GPP network interface to an external third party service provider application.

A service capability exposure function (SCEF) is a core entity within the 3GPP architecture for the service capability exposure that provides a means for securely exposing the services and capabilities provided by 3GPP network interface. In other words, the SCEF is a key entity for providing service functions belonging to a trust domain operated by a mobile communication provider. The SCEF provides API interfaces to third party service providers and provides 3GPP service functions to third party service providers through connections with various entities of 3GPP. The SCEF may be provided by the SCS.

When a Tsp function may be exposed through the application program interface (API), the MTC-IWF may be co-located with the SCEF. A protocol (e.g., DIAMETER, RESTful APIs, XML over HTTP, etc.) is selected to specify a new 3GPP interface depending on multiple factors and herein, the multiple factors include the facilitation of exposure of requested information, and need of a specific interface, but are not limited thereto.

The SCEF is an entity belonged to a Trusted Domain, and may be managed by a Cellular operator or a third party service provider in trusted relation. Particularly, the SCEF is a node for service architecture exposing progressed as a work item such as MONTE, AESE, and the like of 3GPP Release 13, and in connection with 3GPP entities to provide a service, provides functions in relation to monitoring and charging to an external third party. In addition, the SCEF may manage the function such as configuration of communication pattern of the third party service provider into the EPS intermediately.

EPS Cellular Internet of Things (CIoT) Optimization

FIG. 12 is a diagram illustrating a data transmission and reception method for a CIoT device to which the present invention may be applied. In this specification, a data transmission and reception method approved for a CIoT device may be called "CIoT EPS Optimization."

Referring to FIG. 12, the data transmission and reception method may basically include control plane CIoT EPS optimization (i.e., a CP mode/solution) capable of transmitting and receiving data through a control plane path (CP path) and user plane CIoT EPS optimization (i.e., a UP mode/solution) capable of transmitting and receiving data through a user plane path (UP path).

In the case of the CP solution, data is transmitted and received (first CP path) through an SCEF, an MME and a CIoT RAN between an AS and a UE, or data is transmitted and received (second CP path) through an S-GW/P-GW, an MME and a CIoT RAN. In the case of the UP solution, data is transmitted and received through the S-GW/P-GW and CIoT RAN between the AS and the UE.

A UE is required to be registered in a network in order to be provided with a service that requires registration. Such a registration may be referred to as a network access. Hereinafter, an initial access procedure in E-UTRAN will be described.

FIG. 13 is a flowchart illustrating an attach procedure according to an embodiment of the present invention.

1-2. First, a UE camping on an E-UTRAN cell may start an attach procedure with a new MME by transmitting an Attach Request message to an eNB.

The Attach Request message includes an International Mobile Subscriber Identity (IMSI) of the UE, a PDN type requested by the UE, and the like. Here, the PDN type indicates an IP version (i.e., IPv4, IPv4v6 or IPv6) requested by the UE.

The Attach Request message is forwarded by being included in an RRC Connection Setup Complete message in an RRC connection, and forwarded by being included in an Initial UE message in an S1 signaling connection.

In order to request PDN connectivity, the UE may also transmit an Attach Request message together with a PDN Connectivity Request message.

3. If the UE distinguishes the UE itself using a GUTI and an MME is changed to detach later, a new MME may determine a type of an old node (e.g., MME or SGSN) and may use the GUTI received from the UE in order to derive the old MME/SGSN address. In addition, the new MME may transmit an Identification Request (including old GUTI and complete Attach Request message) to the old MME/SGSN in order to request an IMSI. The old MME may identify the Attach Request message by a NAS MAC first, and then may perform an Identification Response (including IMSI and MM context) in response to the Identification Request.

4. If the UE is not known to all of the old MME/SGSN and the new MME, the new MME may transmit an Identification Request to the UE in order to request the IMSI. The UE may respond to the corresponding identification request in response to the Identification Response including the IMSI.

5a. If UE context is not present in a network, the Attach Procedure is not integrity protected or the identification of integrity fails, the Authentication and NAS security setup for activating the integrity protection and the NAS ciphering may be essentially performed. If the NAS security algorithm is changed, the NAS security setup may be performed in this procedure.

5b. A new MME may retrieve/search IMEISV (ME Identity) from the UE. At this time, the IMEISV (ME Identity) may be coded and transmitted except the case that the UE performs an emergency access or is unable to authenticate.

6. If the UE configures a Ciphered Options Transfer Flag in the Attach Request message, the new MME may retrieve/search Ciphered Options (e.g., Protocol Configuration Options (PCO) and/or APN (name of PDN)) from the UE.

7. If bearer context activated in the new MME for a specific UE is present, the new MME deletes the bearer context by transmitting LBI (Delete Session Request) message to a GW. The GWs respond with a Delete Session Response (Cause) message.

8. After the Detach, if the MME is changed, there is no valid UE for the MME, the UE provides an IMSI, the UE provides an invalid old GUTI for the MME, or the GUTI of the UE context is different in the scenario in which a PLMN-ID of TAI by an eNB is shared (e.g., GWCN) in a part of networks, the MME may transmit an Update Location request message to an HSS.

9. The HSS transmits a Cancel Location (including IMSI and Cancellation Type) to the old MME. The old MME responds through Cancel Location Ack (including IMSI), and removes Mobility Management (MM) context and the bearer context.

10. If there is an activated bearer context in the old MME/SGSN with respect to a specific UE, the old MME/SGSN may remove the corresponding bearer context by transmitting Delete Session Request (LBI) to the GW. The GW may transmit the Delete Session Response (Cause) to the old MME/SGSN.

11. In response to the Update Location Request message, the HSS may transmit an Update Location Ack message (including IMSI and Subscription data) to the new MME.

12. In the case of urgent Attach, the MME may apply parameters from MME urgent configuration data for an urgent bearer establishment performed in this step, and may ignore IMSI-related subscriber information stored potentially.

13. A serving GW generates a new item in an EPS Bearer table, and sends a Create Session Request message to a PDN GW (or P-GW) indicated by the PDN GW address which is received from the previous step.

14. If a dynamic PCC is performed and handover indication is not present, the PDN GW performs an IP-CAN Session Establishment process defined in TS 23.203 [6], and by doing this, the PDN GW obtains default PCC rule for the UE.

Steps 12 to 16 described above may be omitted if EPS Session Management (ESM) container is not included in the Attach Request.

15. The P-GW generates a new item in the EPS bearer context table, and generates a charge ID for the default bearer. The new item allows a user plane PDU path between the S-GW and a packet data network by the P-GW and a charge start. In addition, the P-GW transmits a Create Session Response message to the Serving GW.

16. The Serving GW transmits the Create Session Response message to the new MME.

17. The new MME may transmit downlink NAS transport together with an initial context setup request or Attach Accept to the eNB.

18. The eNB transmits an RRC Connection Reconfiguration message including an EPS Radio Bearer Identity to the UE, and at this time, an Attach Accept message is also transmitted to the UE.

19. The UE transmits an RRC Connection Reconfiguration Complete message to the eNB.

20. The eNB transmits an Initial Context Response message to the new MME. The Initial Context Response message includes an address of the eNB used for DL traffic of S1-U reference point.

21. The UE sends a Direct Transfer message including an Attach Complete message (including EPS Bearer Identity, NAS sequence number and NAS-MAC) to the eNB.

22. The eNB forwards the Attach Complete message to the new MME.

23. If both of the Initial Context Response of step 20 and the Attach Complete message of step 22 are received, the new MME transmits a Modify Bearer Request message to the Serving GW.

23a. If a handover indication is included in step 23, the Serving GW sends the Modify Bearer Request message to the PDN GW.

23b. The PDN GW may respond to the Modify Bearer Request message by transmitting a Modify Bearer Response to the Serving GW.

24. The Serving GW may transmit the Modify Bearer Response message (including EPS Bearer Identity) to the new MME. Next, the Serving GW may send buffer DL packets of the Serving GW.

25. The MME sends a Notify Request message including APN and PDN GW identity to the HSS for non-3GPP attach. The corresponding message includes information identifying a PLMN in which the PDN GW is located.

26. The HSS stores the APN and PDN GW identity pair and transmits the Notify Response to the MME.

FIG. 14 illustrates an attach procedure for CIoT EPS optimization to which the present invention may be applied. The description regarding the aforementioned embodiments may be applied to this flowchart identically/similarly, and a redundant description thereof is omitted. In this flowchart, NB-IoT/eMTC corresponds to the aforementioned base station/eNB.

1. First, a UE may transmit, to the NB-IoT/eMTC, an RRC connection setup complete message including an attach request message and CIoT Optimization capability information. In this case, the CIoT Optimization capability information may indicate whether the UE supports a CP solution and/or an UP solution. The attach request message may have included a PNB and Header Compression Configuration information. The preferred network behaviour (PNB) indicates a network operation preferred by the UE. Specifically, the PNB may indicate at least one of the following information.

Whether CP CIoT EPS optimisation is supported

Whether UP CIoT EPS optimisation is supported

Whether CP CIoT EPS optimisation is preferred or whether UP CIoT EPS optimisation is preferred Whether S1-U data transfer is supported Whether SMS transfer without Combined Attach is requested Whether Attach without PDN Connectivity is supported Whether header compression for CP CIoT EPS optimisation is supported 2. The NB-IoT/eMTC may transmit, to an MME/C-SGN, the attach request message and the RAT type information received from the UE through an initial UE message.

3. The MME/C-SGN may transmit, to the NB-IoT/eMTC, a DL NAS transport message or initial context setup request message including an attach accept message. In this case, the attach accept message may have included a supported network behaviour (SNB), a Header Compression Configuration, and a CP Only indicator.

In this case, the CP only indicator is an indicator transmitted only when an MME/C-SGN based on a local policy determines that a PDN connection must use only CP CIoT EPS optimization. For a PDN connection with an SCEF, the MME must always transmit the CP only indicator to the UE through the attach accept message. The UE that has received the CP only indicator for the PDN connection must use CP CIoT EPS optimization for the corresponding PDN connection.

An SNB indicates a network operation supported by the MME/C-SGN. Specifically, the SNB may indicate at least one of the following information.

Whether CP CIoT EPS optimisation is supported
Whether UP CIoT EPS optimisation is supported
Whether S1-U data transfer is accepted
Whether SMS transfer without Combined Attach is requested
Whether Attach without PDN Connectivity is supported
Whether header compression for CP CIoT EPS optimisation is supported 4. Finally, the NB-IoT/eMTC may transmit, to the UE, a DL information transfer message including the attach accept message received from the MME/C-SGN.

In accordance with the present embodiment, if a UE sets up an Attach and PDN connection, when the UE transmits its own CIoT Optimization capability information and PNB to a network, the network may transmit an SNB to the UE as a response thereto. The UE operates according to the SNB.

If the network (e.g., MME) notifies the UE that both CP CIoT EPS optimization (CP mode/solution) and UP CIoT EPS optimization (UP mode/solution) are supported and does not transit a CP only indicator for a PDN connection to be set up to the UE (or if the CP only indicator has not been marked), the UE may request connection setup from the network as a CP mode/solution or UP mode/solution depending on a situation, such as an application condition and/or a data size, when the PDN connection for data transmission and reception is set up.

That is, if the UE determines data transmission and reception through an SRB to be suitable, it may transmit a service request message not having a DRB setup request to the MME. If the UE determines data transmission and reception through a DRB to be suitable, it may transmit a service request message to request DRB setup to the MME. Furthermore, in the case of mobile terminated, the network may request DRB setup from an eNB by taking into consideration a data size to be transmitted or may transmit data through an SRB without DRB setup.

Buffered Data Transmission Method

If the CP mode/solution is used, (DL) data may have been buffered in the MME in addition to the S-GW. If (DL) data buffered in the MME is present as described above, the MME does not release the S11-U when it releases S1 according to the entry of the UE into the idle period. In this case, during the idle period of the UE to which power saving mode (PSM)/eDRX is applied, the (DL) data is transmitted from the S-GW to the MME, buffered in the MME, and transmitted to the UE when a connection with the UE is set up.

That is, in the case of the CP mode/solution, the MME buffers the (DL) data received during the idle period of the UE, and may transmit the buffered data to the UE when the UE contacts the MME. In this case, the MME transmits the buffered data to the UE through an NAS packet data unit (PDU). A case where the UE contacts the MME may include a case where the UE and the MME make transition to the ECM-CONNECTED state through a service request procedure, for example.

In this case if the UE has contacted the MME through a service request message to request DRB setup (i.e., UP mode/solution request), the sequence of (DL) data reaching the UE may be reversed (i.e., out of order) between the sequence of data buffered/stored in the MME and the sequence of data transmitted to the S-GW.

More specifically, when data is buffered in the MME and the UE requests DRB setup for an UP solution/mode application, a data transmission path switches from a CP path to an UP path (i.e., from the S11-U to the S1-U). As a result, an ECM connection is set up between the UE and the MME, and a DRB and an S1 bearer are set up between the UE and the S-GW. As a result, (DL) data buffered in the MME during the idle period of the UE is transmitted to the UE through an ECM connection (i.e., CP path). (DL) data subsequent to the corresponding (DL) data is buffered in the S-GW and transmitted to the UE through the DRB and the S1 bearer (i.e., UP path).

In general, when the data transfer speed through the UP path is considered to be faster than the data transfer speed through the CP path, there is a problem in that the data buffered in the S-GW may be reached earlier than the data buffered in the MME.

In particular, there may be a problem when the data buffered in the MME before the UE transmits (UL) data must be first received. For example, if the data buffered in the MME corresponds to control command (e.g., power off of the UE) data of an application level of the UE, in particular, there may be a problem when the source (i.e., 3'rd party server/AS) of the data buffered/stored in the MME and the source (i.e., 3'rd party server/AS)/service type of the data stored in the S-GW are different. In addition, there is a problem when a (decoding) sequence has been determined between the data buffered in the MME and the data buffered in the S-GW.

If the sequences of data reaching the UE are reversed as described above, there is a problem in that unnecessary operations, such as the execution of the retransmission of a packet and the execution of an operation of deploying (or reordering) the data sequence of an eNB/UE, must be additionally performed.

Accordingly, in order to prevent such a problem, this specification proposes an efficient method for enabling DL data buffered in the MME and DL data buffered in the S-GW to reach the UE in sequence.

FIG. 15 is a flowchart illustrating a service request procedure according to an embodiment of the present invention. The aforementioned embodiments may be applied identically/similarly in relation to this flowchart, and a redundant description thereof is omitted. In the present embodiment, a case where a UE may receive an SNB capable of supporting both the CP and UP modes/solutions from a network through an attach procedure according to the embodiment of FIG. 14 is assumed.

0. During the idle period (or, ECM-Idle period) of the UE, the MME may buffer/store (DL) data for the corresponding UE. This step may be performed when the TEID (S11-U TEID) of the DL direction MME is not released from the S-GW.

1. The MME may receive a service request (message) to request DRB setup (i.e., UP mode/solution) from the UE.

2. The MME may transmit data buffered/stored for the UE to the eNB if the buffered/stored data is present. In this case, the MME may transmit now buffered/stored data to the UE through an initial context setup message for E-RAB setup.

2-1. If there is buffered (DL) data that has not been transmitted to the UE, the MME transmits all of the corresponding data to the eNB using a DL S1-AP message. That is, if the transmission of the buffered (DL) data has not been completed through the initial context setup message, the MME may complete the transmission of the data additionally using a DL S1-AP message.

3. When the eNB receives the initial context setup message, it may start the execution of DRB setup (or the application of the UP mode/solution, the setup of an UP path) for the UE. More specifically, for the DRB setup, the eNB transmits an RRC connection reconfiguration message to the UE. Furthermore, when the eNB receives the initial context setup message, it may establish an UL S1-U with the S-GW by receiving an UL S1-U address (e.g., S-GW address, UL S-GW TEID).

When this step is terminated, the setup of the DRB between the eNB and the UE is completed, so all of uplink EPS bearers from the UE to the P-GW are configured. As a result, the buffered DL data transmitted from the MME to the eNB in step 2 and/or step 2-1 is transmitted to the UE through the DRB, and at the same time, UL data may be transmitted to the S-GW through the DRB/S1-U.

4. The DRB setup and UL S1-U are established, so the UE may transmit the UL data to the S-GW.

5. The eNB may transmit an initial context setup complete message to the MME.

6. When the S-GW receives the UL data (or UL packet) of a specific UE from the eNB, it releases an S11-U configured in the DL direction. More specifically, when the S-GW receives uplink data from the eNB in the state in which the S11-U has been set up (i.e., the state in which the CP mode has been applied), it may recognize the application of the UP mode/solution.

More specifically, if S-GW context data does not indicate a downlink user plane TEID toward the MME, the S-GW may recognize that the CP mode has now been applied to the UE (or S11-U is set up). In this situation, when the S-GW receives uplink data from the UE/eNB, it may recognize indication for the application of the UP mode/solution and change a mode from the CP mode/solution to the UP mode/solution. In this case, the S-GW may release the S11-U set up in the DL direction and buffer DL data until the DL direction S1-U is set up. More specifically, the S-GW disconnects/stops the data path in which the DL data is transmitted to the MME and directly buffer/store DL data from a current occasion.

That is, from this flowchart, the uplink data transmitted from the eNB to the S-GW may be considered to be an indicator to implicitly indicate the release of 11-U. In other words, the condition in which the S-GW buffers DL data corresponds to ii) the reception of uplink data i) in the state in which the S11-U has been set up. If the condition is satisfied, the S-GW directly buffers the DL data without delivering the DL data to the MME until the S1-U of the DL direction is set up.

Alternatively, unlike in the present embodiment, the eNB may explicitly signal an indicator that instructs the DL data to be buffered (or an indicator indicating switching from the CP mode to the UP mode), and may transmit the indicator to the S-GW along with the uplink data or separately from the uplink data. The S-GW that has received the corresponding indicator may release the S11-U set up in the DL direction, and may buffer the DL data until the DL direction S1-U is set up.

7. The MME delays the transmission of a Modify bearer request message to the S-GW until all of the buffered/stored DL data is transmitted to the eNB (or UE). The reason for this is that when the Modify bearer request message is transmitted to the S-GW, a downlink EPS bearer from the P-GW to the UE is fully configured because the generation of a downlink S1 bearer between the eNB and the S-GW is completed. In this case, as described above, the aforementioned "out of order" problem occurs because the data buffered in the S-GW is transmitted to the UE before the transmission of the data buffered in the MME to the UE is completed.

Accordingly, the MME may delay the transmission of the Modify bearer request message until the transmission of the buffered data to the eNB (or UE) is completed through step 2 and/or step 2-1 (or until the completion of the transmission is confirmed).

8. When it is determined that all of the buffered DL data has been transmitted, the MME transmits the Modify bearer request message, including the address of the eNB and a TEID, to the S-GW so that the DL S1-U is set up.

9. The S-GW may transmit a Modify bearer response message to the MME as a response to the Modify bearer request message.

10. After the procedure up to step 9 is completed, the DL data is transmitted to the UE via the eNB through the S1-U (i.e., according to the UP mode/solution).

FIG. 16 is a flowchart illustrating a buffered data transmission method of an MME according to an embodiment of the present invention. The aforementioned embodiments may be applied identically/similarly in relation to this flowchart, and a redundant description thereof is omitted.

First, the MME may perform the CP mode, that is, a data transmission mode in which data is transmitted and received between a UE and an eNB, through a control plane SRB (S1610). In this flowchart, the UE may correspond to a UE that does not receive a CP only indicator indicating the application of only the CP mode from the MME in the last attach procedure.

Next, when the MME receives uplink data for the UE from the S-GW during the idle period in which the ECM-idle state of the UE is maintained, the MME may buffer the uplink data (S1620). In this case, the buffered data may be transmitted to the eNB through an initial context setup request message to be described later. If the remaining buffered data not transmitted through the initial context setup request message is present among the buffered data (i.e., if the data buffered in the MME is not fully transmitted through the initial context setup request message), the remaining buffered data may be transmitted to the eNB through an S1-AP message.

Next, the MME may receive, from the UE, a service request message to request the UP mode, that is, a data transmission mode in which data is transmitted and received between the UE and the eNB through a DRB in the user plane (S1630).

Next, the MME may transmit an initial context setup request message for configuring the DRB to the eNB, and may receive an initial context setup complete message from the eNB as a response to the initial context setup request message (S1640). The initial context setup message may have included the address of the S-GW and/or a tunnel endpoint ID (TEID). In this flowchart, the S-GW may be a network node that stops uplink data transmission to the MME and buffers the uplink data when it receives the uplink data from the UE.

Next, the MME may transmit a Modify bearer request message for configuring a S1 bearer between the eNB and the S-GW to the S-GW (S1650). The Modify bearer request message may have included the address of the eNB and/or a TEID. The Modify bearer request message may be performed after the transmission of data buffered in the MME to the eNB is completed.

Furthermore, although not shown in this flowchart, the MME may receive a Modify bearer response message from the S-GW as a response to the Modify bearer request message.

In this flowchart, the data buffered in the MME may correspond to control command data of an application level. And/or a first application server that transmits the buffered data to the S-GW may be different from a second application server that has transmitted the buffered data to the MME.

Overview of Devices to Which the Present Invention May Be Applied

FIG. 17 illustrates a block diagram of a communication device according to one embodiment of the present invention.

With reference to FIG. 17, a wireless communication system includes a network node 1710 and a plurality of UEs 1720.

The network node 1710 includes a processor 1711, memory 1712, and a communication module 1713. The processor 1711 implements the functions, processes and/or methods proposed in FIGS. 1 to 16. The processor 1711 can implement layers of wired/wireless interface protocol. The memory 1712 is connected to the processor 1711, and stores various types of information for driving the processor 1711. The communication module 1713 is connected to the processor 1711, and transmits and/or receives wired/wireless signals. Examples of the network node 1710 include an eNB, MME, HSS, SGW, PGW, application server and so on. In particular, if the network node 1710 is an eNB, the communication module 1713 can include a Radio Frequency (RF) unit for transmitting/receiving a radio signal.

The UE 1720 includes a processor 1721, memory 1722, and a communication module (or RF unit) 1723. The processor 1721 implements the functions, processes and/or methods proposed through FIGS. 1 to 16. The processor 1721 can implement layers of wired/wireless interface protocol. The memory 1722 is connected to the processor 1721, and stores various types of information for driving the processor 1721. The communication module 1723 is connected to the processor 1721, and transmits and/or receives wired/wireless signals.

The memory 1712, 1722 may be installed inside or outside the processor 1711, 1721 and may be connected to the processor 1711, 1721 through various well-known means. Furthermore, the network node 1710 (in the case of an eNB) and/or the UE 1720 can have a single antenna or multiple antennas.

FIG. 18 illustrates a block diagram of a wireless communication apparatus according to an embodiment of the present invention.

Particularly, in FIG. 18, the UE described above FIG. 17 will be described in more detail.

Referring to FIG. 18, the UE includes a processor (or digital signal processor) 1810, an RF module (RF unit) 1835, a power management module 1805, an antenna 1840, a battery 1855, a display 1815, a keypad 1820, memory 1830, a subscriber identification module (SIM) card 1825 (which may be optional), a speaker 1845 and a microphone 1850. The UE may include a single antenna or multiple antennas.

The processor 1810 may be configured to implement the functions, procedures and/or methods proposed by the present invention as described in FIGS. 1 to 17. The layers of a wireless interface protocol may be implemented by the processor 1810.

The memory 1830 is connected to the processor 1810 and stores information related to operations of the processor 1810. The memory 1830 may be located inside or outside the processor 1810 and connected to the processors 1810 through various well-known means.

A user enters instructional information, such as a telephone number, for example, by pushing the buttons of a keypad 1820 or by voice activation using the microphone 1850. The microprocessor 1810 receives and processes the instructional information to perform the appropriate function, such as to dial the telephone number. Operational data may be retrieved from the SIM card 1825 or the memory module 1830 to perform the function. Furthermore, the processor 1810 may display the instructional and operational information on the display 1815 for the user's reference and convenience.

The RF module 1835 is connected to the processor 1810, transmits and/or receives an RF signal. The processor 1810 issues instructional information to the RF module 1835, to initiate communication, for example, transmits radio signals comprising voice communication data. The RF module 1835 comprises a receiver and a transmitter to receive and transmit radio signals. An antenna 1840 facilitates the transmission and reception of radio signals. Upon receiving radio signals, the RF module 1835 may forward and convert the signals to baseband frequency for processing by the processor 1810. The processed signals would be transformed into audible or readable information outputted via the speaker 1845.

The aforementioned embodiments are achieved by a combination of structural elements and features of the present invention in a predetermined manner. Each of the structural elements or features should be considered selectively unless specified separately. Each of the structural elements or features may be carried out without being combined with other structural elements or features. Furthermore, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

MODE FOR INVENTION

Various forms for implementing the present invention have been described in the best mode for implementing the present invention.

INDUSTRIAL APPLICABILITY

The present invention has been illustrated as being basically applied to the 3GPP LTE/LTE-A system, but may be applied to various wireless communication systems in addition to the 3GPP LTE/LTE-A system.

The invention claimed is:

1. A method for a mobility management entity (MME) to transmit buffered data in a wireless communication system, the method comprising steps of:
performing a control plane (CP) mode which is a data transmission mode in which data is transmitted and received between a base station and a user equipment through a signaling radio bearer (SRB) in a control plane;
buffering downlink data when the downlink data for the user equipment is received from a serving-gateway (S-GW) during an idle period in which an EPS connection management (ECM)-idle state of the user equipment is maintained;
receiving, from the user equipment, a service request message to request a user plane (UP) mode which is a data transmission mode in which data is transmitted and received between the user equipment and the base station through a data radio bearer (DRB) in a user plane;
transmitting, to the base station, an initial context setup request message for configuring the DRB and receiving, from the base station, an initial context setup complete message as a response to the initial context setup request message; and
transmitting, to the S-GW, a Modify bearer request message for configuring an S1 bearer between the base station and the S-GW,
wherein the buffered data is transmitted to the base station through the initial context setup request message.

2. The method of claim 1, wherein, when remaining buffered data not transmitted through the initial context setup request message among the buffered data is present, the remaining buffered data is transmitted to the base station through an S1-application protocol (AP) message.

3. The method of claim 2, wherein the step of transmitting the Modify bearer request message is performed after the transmission of the buffered data to the base station is completed.

4. The method of claim 3, wherein the initial context setup message further comprises an address of the S-GW and/or a tunnel endpoint ID (TEID).

5. The method of claim 3, wherein the Modify bearer request message comprises an address of the base station and/or a TEID.

6. The method of claim 5, further comprising a step of receiving, from the S-GW, a Modify bearer response message as a response to the Modify bearer request message.

7. The method of claim 6, wherein the S-GW is a network node which stops the downlink data transmission to the MME and buffers the downlink data when uplink data is received from the user equipment in a state in which S-GW context data does not indicate a downlink user plane TEID toward the MME.

8. The method of claim 7, wherein the data buffered in the MME corresponds to control command data of an application level.

9. The method of claim 7, wherein a first application server which has transmitted the data buffered in the S-GW is different from a second application server which has transmitted the data buffered in the MME.

10. The method of claim 6, wherein the user equipment is a user equipment not receiving a CP only indicator indicating an use of only the CP mode from the MME in a last attach procedure.

11. A mobility management entity (MME), comprising:
a communication module for transmitting and receiving signals; and
a processor controlling the communication module,
wherein the processor is configured to:
perform a control plane (CP) mode which is a data transmission mode in which data is transmitted and received between a base station and a user equipment through a signaling radio bearer (SRB) in a control plane,
buffer downlink data when the downlink data for the user equipment is received from a serving-gateway (S-GW) during an idle period in which an EPS connection management (ECM)-idle state of the user equipment is maintained,
receive, from the user equipment, a service request message to request a user plane (UP) mode which is a data transmission mode in which data is transmitted and received between the user equipment and the base station through a data radio bearer (DRB) in a user plane,
transmit, to the base station, an initial context setup request message for configuring the DRB and receiving, from the base station, an initial context setup complete message as a response to the initial context setup request message, and
transmit, to the S-GW, a Modify bearer request message for configuring an S1 bearer between the base station and the S-GW,
wherein the buffered data is transmitted to the base station through the initial context setup request message.

12. The MME of claim 11, wherein, when remaining buffered data not transmitted through the initial context setup request message is present in the buffered data, the remaining buffered data is transmitted to the base station through an S1-application protocol (AP) message.

13. The MME of claim 12, wherein the processor delays a transmission occasion of the Modify bearer request message after the transmission of the buffered data to the base station is completed.

14. The MME of claim 11, wherein the S-GW is a network node which stops the downlink data transmission to the MME and buffers the downlink data when uplink data is received from the user equipment in a state in which S-GW context data does not indicate a downlink user plane TEID toward the MME.

15. The MME of claim 11, wherein the user equipment is a user equipment not receiving a CP only indicator indicating an use of only the CP mode from the MME in a last attach procedure.

* * * * *